United States Patent
Wilcock

(10) Patent No.: US 7,065,222 B2
(45) Date of Patent: Jun. 20, 2006

(54) FACILITATION OF CLEAR PRESENTATION IN AUDIO USER INTERFACE

(75) Inventor: Lawrence Wilcock, Malmesbury (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 375 days.

(21) Appl. No.: 10/058,000

(22) Filed: Jan. 29, 2002

(65) Prior Publication Data

US 2002/0143414 A1 Oct. 3, 2002

(30) Foreign Application Priority Data

Jan. 29, 2001 (GB) ................. 0102230.0
Nov. 20, 2001 (GB) ................. 0127766.4

(51) Int. Cl.
*H04R 5/02* (2006.01)
(52) U.S. Cl. ............... 381/310; 381/17; 381/18; 381/19; 381/61; 700/94
(58) Field of Classification Search .............. 700/94; 381/310, 17, 18, 19, 20, 304, 305, 61, 94.5, 381/106

See application file for complete search history.

(56) References Cited

U.S. PATENT DOCUMENTS

| | | | |
|---|---|---|---|
| 5,826,064 A | 10/1998 | Loring et al. | |
| 5,850,455 A | 12/1998 | Arnold et al. | |
| 5,943,427 A | 8/1999 | Massie et al. | |
| 6,046,722 A | * 4/2000 | McKiel, Jr. | 345/862 |
| 6,054,989 A | 4/2000 | Robertson et al. | |
| 6,498,857 B1 | * 12/2002 | Sibbald | 381/310 |

FOREIGN PATENT DOCUMENTS

| | | |
|---|---|---|
| EP | 0528743 A1 | 2/1993 |
| EP | 0966719 A2 | 12/1999 |
| GB | 2360681 A | 9/2001 |
| JP | 8-76919 | 3/1996 |
| JP | 2000-322168 | 11/2000 |
| WO | 92/09921 | 6/1992 |

OTHER PUBLICATIONS

Kobayashi, Minoru et al, "Dynamic Soundscape: mapping time to space for audio browsing," CHI 97 Electronic Publications: Papers, http://www.acm.org/sigchi/chi97/proceedings/paper/kob.htm.

(Continued)

*Primary Examiner*—Huyen Le
*Assistant Examiner*—Justin Michalski

(57) ABSTRACT

An audio user interface is provided in which items are represented in an audio field by corresponding synthesized sound sources from where sounds related to the items appear to emanate. At least some of the sound sources are associated in a collection as members of the collection; the collection itself has an associated collection-representing sound source. The collection can be changed in either direction between an un-collapsed state in which the member sound sources are present un-muted in the audio field, and a collapsed state in which the member sound sources are muted with the collection-representing sound source providing an audible presence for the collection in the audio field.

44 Claims, 14 Drawing Sheets

OTHER PUBLICATIONS

Billinghurst, M. et al, "A Wearable Spatial Conferencing Space," Human Interface Technology Laboratory, Seattle, WA and Advanced Perception Unit, Ipswich, UK.

Goose, S. et al, "A 3D Audio Only Interactive Web Browser: Using Spatialization to Convey Hypermedia Document Structure," ACM Multimedia '99 Oct. 1999, Orlando, FL.

Sawhney, Nitin et al, "Speaking and Listening on the Run: Design for Wearable Audio Computing," 1998 IEEE.

Kyriakakis, C. et al, "Signal Processing, Acoustics, and Psychoacoustics for High Quality Desktop Audio," *Journal of Visual Communication and Image Representation*, vol. 9, No. 1, Mar., pp. 51-61, 1998.

King, Robert B. et al, "The Impact of Signal Bandwidth on Auditory Localization: Implications for the Design of Three-Dimensional Audio Displays," *Human Factors*, 1997, 39(2), 287-295.

Sawhney, N. et al., "Nomadic Radio: Speech & Audio Interaction for Contextual Messaging in Nomadic Environments," Speech Interface Group, MIT Media Lab, E15-352, Cambridge, MA.

Schmandt, C., "Audio Hallway: a Virtual Acoustic Environment for Browsing," ACM 0-58113-034-1/98/11, UIST '98, San Francisco, CA.

\* cited by examiner

FACILITATION OF CLEAR PRESENTATION IN AUDIO USER INTERFACE

FIELD OF THE INVENTION

The present invention relates to facilitation of clear presentation in audio user interfaces in which sound sources are synthesised in an audio field.

BACKGROUND OF THE INVENTION

The human auditory system, including related brain functions, is capable of localizing sounds in three dimensions notwithstanding that only two sound inputs are received (left and right ear). Research over the years has shown that localization in azimuth, elevation and range is dependent on a number of cues derived from the received sound. The nature of these cues is outlined below.

Azimuth Cues—The main azimuth cues are Interaural Time Difference (ITD—sound on the right of a hearer arrives in the right ear first) and Interaural Intensity Difference (IID—sound on the right appears louder in the right ear). ITD and IIT cues are complementary inasmuch as the former works better at low frequencies and the latter better at high frequencies.

Elevation Cues—The primary cue for elevation depends on the acoustic properties of the outer ear or pinna. In particular, there is an elevation-dependent frequency notch in the response of the ear, the notch frequency usually being in the range 6–16 kHz depending on the shape of the hearer's pinna. The human brain can therefore derive elevation information based on the strength of the received sound at the pinna notch frequency, having regard to the expected signal strength relative to the other sound frequencies being received.

Range Cues—These include:
- loudness (the nearer the source, the louder it will be; however, to be useful, something must be known or assumed about the source characteristics),
- motion parallax (change in source azimuth in response to head movement is range dependent), and
- ratio of direct to reverberant sound (the fall-off in energy reaching the ear as range increases is less for reverberant sound than direct sound so that the ratio will be large for nearby sources and small for more distant sources).

It may also be noted that in order avoid source-localization errors arising from sound reflections, humans localize sound sources on the basis of sounds that reach the ears first (an exception is where the direct/reverberant ratio is used for range determination).

Getting a sound system (sound producing apparatus) to output sounds that will be localized by a hearer to desired locations, is not a straight-forward task and generally requires an understanding of the foregoing cues. Simple stereo sound systems with left and right speakers or headphones can readily simulate sound sources at different azimuth positions; however, adding variations in range and elevation is much more complex. One known approach to producing a 3D audio field that is often used in cinemas and theatres, is to use many loudspeakers situated around the listener (in practice, it is possible to use one large speaker for the low frequency content and many small speakers for the high-frequency content, as the auditory system will tend to localize on the basis of the high frequency component, this effect being known as the Franssen effect). Such many-speaker systems are not, however, practical for most situations.

For sound sources that have a fixed presentation (non-interactive), it is possible to produce convincing 3D audio through headphones simply by recording the sounds that would be heard at left and right eardrums were the hearer actually present. Such recordings, known as binaural recordings, have certain disadvantages including the need for headphones, the lack of interactive controllability of the source location, and unreliable elevation effects due to the variation in pinna shapes between different hearers.

To enable a sound source to be variably positioned in a 3D audio field, a number of systems have evolved that are based on a transfer function relating source sound pressures to ear drum sound pressures. This transfer function is known as the Head Related Transfer Function (HRTF) and the associated impulse response, as the Head Related Impulse Response (HRIR). If the HRTF is known for the left and right ears, binaural signals can be synthesized from a monaural source. By storing measured HRTF (or HRIR) values for various source locations, the location of a source can be interactively varied simply by choosing and applying the appropriate stored values to the sound source to produce left and right channel outputs. A number of commercial 3D audio systems exist utilizing this principle. Rather than storing values, the HRTF can be modeled but this requires considerably more processing power.

The generation of binaural signals as described above is directly applicable to headphone systems. However, the situation is more complex where stereo loudspeakers are used for sound output because sound from both speakers can reach both ears. In one solution, the transfer functions between each speaker and each ear are additionally derived and used to try to cancel out cross-talk from the left speaker to the right ear and from the right speaker to the left ear.

Other approaches to those outlined above for the generation of 3D audio fields are also possible as will be appreciated by persons skilled in the art. Regardless of the method of generation of the audio field, most 3D audio systems are, in practice, generally effective in achieving azimuth positioning but less effective for elevation and range. However, in many applications this is not a particular problem since azimuth positioning is normally the most important. As a result, systems for the generation of audio fields giving the perception of physically separated sound sources range from full 3D systems, through two dimensional systems (giving, for example, azimuth and elevation position variation), to one-dimensional systems typically giving only azimuth position variation (such as a standard stereo sound system). Clearly, 2D and particularly 1D systems are technically less complex than 3D systems as illustrated by the fact that stereo sound systems have been around for very many years.

In terms of user experience, headphone-based systems are inherently "head stabilized"—that is, the generated audio field rotates with the head and thus the position of each sound source appears stable with respect to the user's head. In contrast, loudspeaker-based systems are inherently "world stabilized" with the generated audio field remaining fixed as the user rotates their head, each sound source appearing to keep its absolute position when the hearer's head is turned. In fact, it is possible to make headphone-based systems "world stabilized" or loudspeaker-based systems "head stabilized" by using head-tracker apparatus to sense head rotation relative to a fixed frame of reference and feed corresponding signals to the audio field generation system, these signals being used to modify the sound source positions to achieve the desired effect. A third type of stabilization is also sometimes used in which the audio field rotates with the user's body rather than with their head so that a user can vary the perceived positions of the sound sources by rotating their head; such "body stabilized" systems can be achieved, for example, by using a loudspeaker-based system with small loudspeakers mounted on the user's upper body or by a headphone—based system used in conjunction with head tracker apparatus sensing head rotation relative to the user's body.

As regards the purpose of the generated audio field, this is frequently used to provide a complete user experience either alone or in conjunction with other artificially-generated sensory inputs. For example, the audio field may be associated with a computer game or other artificial environment of varying degree of user immersion (including total sensory immersion). As another example, the audio field may be generated by an audio browser operative to represent page structure by spatial location.

Alternatively, the audio field maybe used to supplement a user's real world experience by providing sound cues and information relevant to the user's current real-world situation. In this context, the audio field is providing a level of "augmented reality".

It is an object of the present invention to facilitate clear presentation in audio user interfaces in which sound sources are synthesised in an audio field.

SUMMARY OF THE INVENTION

According to one aspect of the present invention, there is provided an audio user-interfacing method in which items are represented in an audio field by corresponding synthesized sound sources from where sounds related to the items appear to emanate, the method including the steps of:

(a) associating at least some of the sound sources into a collection of which they are members; and (b) changing the collection in either direction between:
an un-collapsed state in which the member sound sources are present un-muted in the audio field;
a collapsed state in which the member sound sources are muted and a collection-representing sound source provides an audible presence for the collection in the audio field.

According to another aspect of the invention, there is provided apparatus for providing an audio user interface in which items are represented in an audio field by corresponding synthesized sound sources from where sounds related to the items appear to emanate, the apparatus comprising:

storage means for storing data on the sound sources, this data including audibility data for controlling the audibility of the sources in the audio field, and collection data for associating at least some of the sound sources into a collection of which those sound sources are members and for further associating with the collection a collection-representing sound source;

rendering-position determining means for determining, for each said sound source, an associated rendering position at which the sound source is to be synthesized to sound in the audio field;

collection-control means for changing the collection in either direction between un-collapsed and collapsed states and for correspondingly setting the audibility data of the associated sound sources such that:
in the un-collapsed state of the collection, the member sound sources are audible;
in the collapsed state of the collection, the member sound sources are muted and the collection-representing sound source provides an audible presence for the collection in the audio field.; and rendering means, including audio output devices, for generating an audio field in which said sound sources are synthesized at their associated rendering positions and with audibility as set by said collection-control means.

BRIEF DESCRIPTION OF THE DRAWINGS

Embodiments of the invention will now be described, by way of non-limiting example, with reference to the accompanying diagrammatic drawings, in which.

BEST MODE OF CARRYING OUT THE INVENTION

Figure 1:
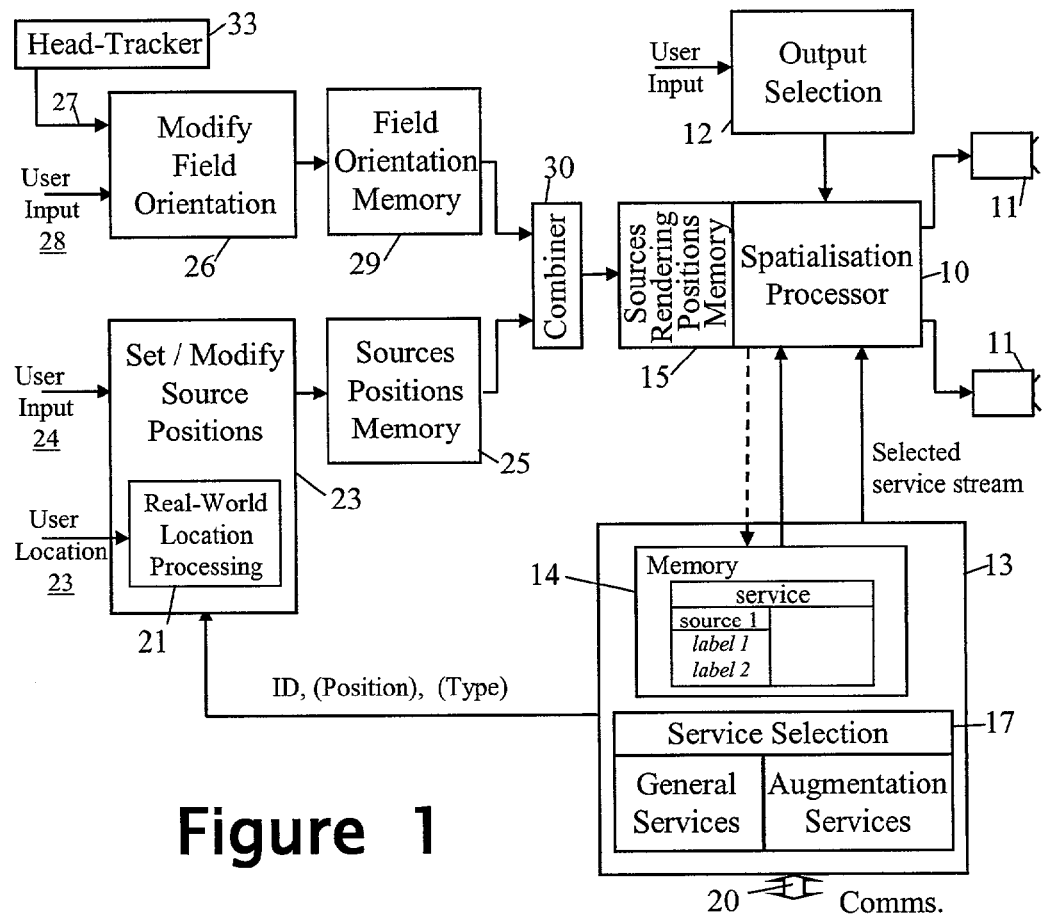
FIG. 1 is a functional block diagram of a first audio-field generating apparatus.

The forms of apparatus to be described below are operative to produce an audio field to serve as an audio interface to services such as communication services (for example, e-mail, voice mail, fax, telephone, etc.), entertainment services (such as internet radio), information resources (including databases, search engines and individual documents), transactional services (for example, retail and banking web sites), augmented-reality services, etc.

When the apparatus is in a "desktop" mode, each service is represented in the audio field through a corresponding synthesized sound source presenting an audio label (or "earcon") for the service. The audio label associated with a service can be constituted by any convenient audio element suitable for identifying that service—for example, an audio label can be the service name, a short verbal descriptor, a characteristic sound or jingle, or even a low-level audio feed from the service itself. The sound sources representing the services are synthesized to sound, to a user, as though they exist at respective locations in the audio field using any appropriate spatialisation method; these sound sources do not individually exist as physical sound output devices though, of course, such devices are involved in the process of synthesizing the sound sources. Furthermore, the sound sources only have a real-world existence to the extent that service-related sounds are presented at the sound-source locations. Nevertheless, the concept of sound sources located at specific locations in the audio field is useful as it enables the sound content that is to be presented in respect of a service to be disassociated from the location and other presentation parameters for those sounds, these parameters being treated as associated with the corresponding sound source. Thus, the present specification is written in terms of such sound sources spatialized to specific locations in the audio field.

Upon a service presented through a sound source being selected (in a manner to be described hereinafter), the apparatus changes from the desktop mode to a service mode in which only the selected service is output, a full service audio feed now being presented in whatever sound spatialisation is appropriate for the service. When a user has finished using the selected service, the user can switch back to the desktop mode.

It will be appreciated that other possibilities exist as to how the services are presented and accessed—for example, the feed from a selected service can be output simultaneously with background presentation of audio labels for the other available services. Furthermore, a service can provide its data in any form capable of being converted in audible form; for example, a service may provide its audio label in text form for conversion by a text-to-speech converter into audio signals, and its full service feed as digitised audio waveform signals.

It is also possible in the desktop mode to use more than one sound source to represent a particular service and/or to associate more than one audio label with each sound source as will be seen hereinafter.

Audio Field Organisation—Spherical Field Example

Considering now the first apparatus (FIG. 1), in the form of the apparatus primarily to be described below, the audio field is a 2D audio field configured as the surface of a sphere (or part of a sphere). Such a spherical-surface audio field is depicted in FIG. 2 where a spatialised sound source 40 (that is, a service audio label that has been generated so as to appear to come from a particular location in the audio field) is represented as a hexagon positioned on the surface of a sphere 41 (illustrated in dashed outline). It maybe noted that although such a spherical surface exists in three-dimensional space, the audio field is considered to be a 2 dimensional field because the position of spatialised sound sources in the audio field, such as source 40, can be specified by two orthogonal measures; in the present case these measures are an azimuth angle X° and an elevation angle Y°. The azimuth angle is measured relative to an audio-field reference vector 42 that lies in a horizontal plane 43 and extends from the centre of sphere 41. The elevation angle is the angle between the horizontal and the line joining the centre of the sphere and the sound source 40.

Figure 2:
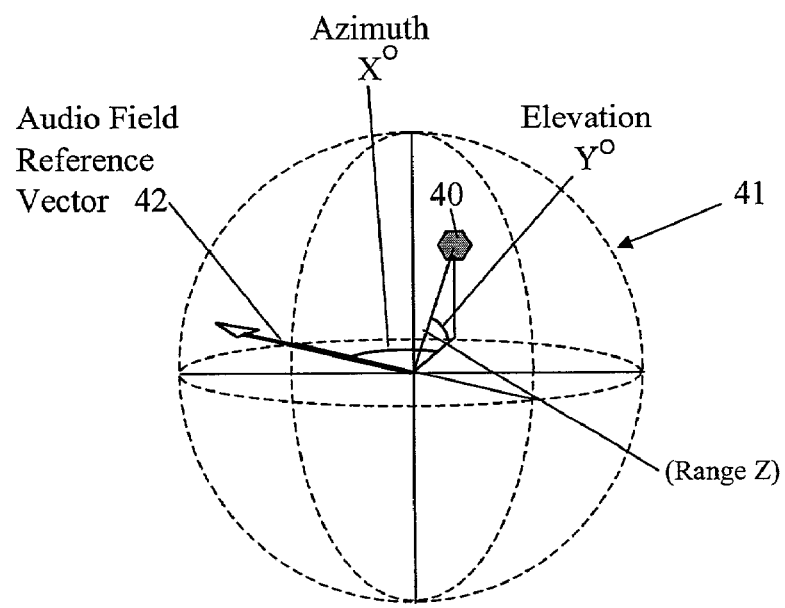
FIG. 2 is a diagram illustrating a coordinate system for positions in a spherical audio field.

In fact, the FIG. 1 apparatus is readily adapted to generate a 3D audio field with the third dimension being a range measure Z, also depicted in FIG. 2, that is the distance from the centre of sphere 41 to the spatialised sound source 40. Conversely, the FIG. 1 apparatus can be adapted to generate a 1D audio field by doing away with the elevation dimension of the spatialised sound sources.

Figure 3:
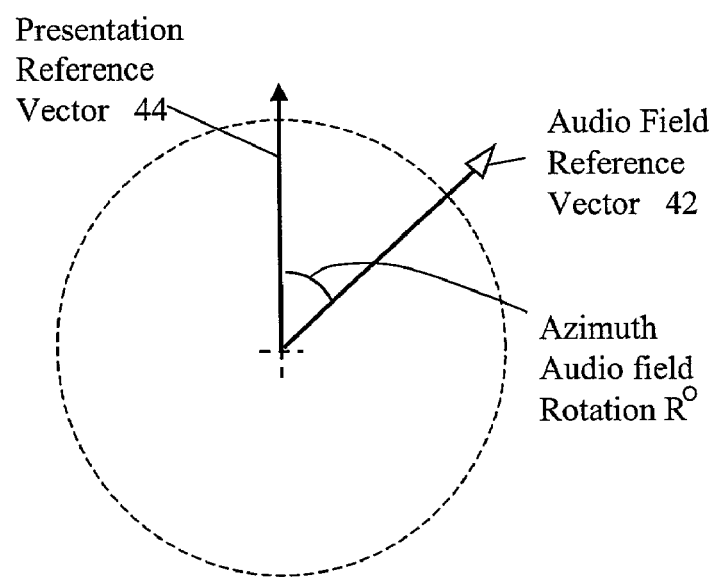
FIG. 3 is a diagram illustrating rotation of an audio field relative to a presentation reference vector.

The FIG. 1 apparatus supports azimuth rotation of the audio field, this potentially being required for implementing a particular stabilization (that is, for example, head, body, vehicle or world stabilization) of the audio field as well as providing a way for the user to explore the audio field by commanding a particular rotation of the audio field. As is illustrated in FIG. 3, the azimuth rotation of the field can be expressed in terms of the angle R between the audio-field reference vector 42 and a presentation reference vector 44.

This presentation reference vector corresponds to the straight-ahead centreline direction for the configuration of audio output devices 11 being used. Thus, for a pair of fixed, spaced loudspeakers, the presentation reference vector 44 is the line of equidistance from both speakers and is therefore itself fixed relative to the world; for a set of headphones, the presentation reference vector 44 is the forward facing direction of the user and therefore changes its direction as the user turns their head. When the field rotation angle R=0°, the audio-field reference vector 42 is aligned with the presentation reference vector 44. The user is at least notionally located at the origin of the presentation reference vector.

The actual position at which a service-representing sound source is to be rendered in the audio output field (its "rendering position") by the FIG. 1 apparatus, must be derived relative to the presentation reference vector since this is the reference used by the spatialisation processor 10 of the apparatus. The rendering position of a sound source is a combination of the intended position of the source in the audio field judged relative to the audio-field reference vector, and the current rotation of the audio field reference vector relative to the presentation reference vector.

As already intimated, apart from any specific azimuth rotation of the audio field deliberately set by the user, the audio field may need to be rotated in azimuth to provide a particular audio-field stabilisation. Whether this is required depends on the selected audio-field stabilization and the form of audio output devices. Thus, by way of example, unless otherwise stated, it will be assumed below that the audio output devices 11 of FIG. 1 apparatus are headphones and the audio field is to be body-stabilised so that the orientation of the audio field relative to the user's body is unaltered when the user turns their head—this is achieved by rotation of the audio field relative to the presentation reference vector for which purpose a suitable head-tracker sensor 33 is provided to measure the azimuth rotation of the user's head relative to its straight-ahead position (that is, relative to the user's body). As the user turns their head, the angle measured by sensor 33 is used to rotate the audio field by the same amount but in the opposite direction thereby stabilising the rendering positions of the sound sources relative to the user's body.

It will be appreciated that had it been decided to head-stabilise the field, then for audio output devices in the form of headphones, it would have been unnecessary to modify the orientation of the audio field as the user turned their head and, in this case, there would be no need for the head-tracker sensor 33. This would also be true had the audio output devices 11 taken the form of fixed loudspeakers and the audio field was to be world-stabilized. Where headphones are to be used and the audio field is to be world stabilised, the orientation of the audio field must be modified by any change in orientation of the user's head relative to the world, whether caused by the user turning their head or by body movements; a suitable head-tracker can be provided by a head-mounted electronic compass. Similarly, if the audio output devices 11 are to be provided by a vehicle sound system and the audio field is to be world stabilised, the orientation of the audio field must be modified by any change in orientation of the vehicle as determined by any suitable sensor. It may be generally be noted that where a user is travelling in a vehicle, the latter serves as a local world so that providing vehicle stabilisation of the audio field is akin to providing world stabilisation (whether the audio output devices are headphones, body mounted or vehicle mounted) but with any required sensing of user head/body rotation relative to the world now being done with respect to the vehicle.

It is also to be noted that the audio-field rotation discussed above only concerned azimuth rotation—that is, rotation about a vertical axis. It is, of course, also possible to treat rotation of the field in elevation in a similar manner both to track head movements (nodding up and down) to achieve a selected stabilisation and to enable the user to command audio-field elevation-angle changes; appropriate modifications to the FIG. 1 apparatus to handle rotation in elevation in this way will be apparent to persons skilled in the art.

Considering FIG. 1 in more detail, services are selected by subsystem 13, these services being either local (for example, an application running on a local processor) or accessible via a communications link 20 (such as a radio link or fixed wire connection providing internet or intranet access). The services can conveniently be categorised into general services such as e-mail, and services that have relevance to the immediate vicinity (augmentation services). The services are selected by selection control block 17 according to predetermined user-specified criteria and possibly also by real-time user input provided via any suitable means such as a keypad, voice input unit or interactive display.

A memory 14 is used to store data about the selected services with each such service being given a respective service ID. For each selected service, memory 14 holds access data (e.g. address of service executable or starting URL) and data on the or each sound source specified by the service or user to be used to represent the service with each such sound source being distinguished by a suitable suffix to the service ID. For each sound source, the memory holds data on the or each associated audio label, each label being identified by a further suffix to the suffixed service ID used to identify the sound source. The audio labels for the selected services are either provided by the services themselves to the subsystem 13 or are specified by the user for particular identified services. The labels are preferably provided and stored in text-form for conversion to audio by a text-to-speech converter (not shown) as and when required by the spatialisation processor. Where the audio label associated with a service is to be a low-level live feed, memory 14 holds an indicator indicating this. Provision may also be made for temporarily replacing the normal audio label of a service sound source with a notification of a significant service-related event (for example, where the service is an e-mail service, notification of receipt of a message may temporarily substitute for the normal audio label of the service).

As regards the full service feed of any particular service, this is not output from subsystem 13 until that service is chosen by the user by input to output selection block 12.

Rather than the services to be represented in the audio interface being selected by block 17 from those currently found to be available, a set of services to be presented can be pre-specified and the related sound-source data (including audio labels) for these services stored in memory 14 along with service identification and access data. In this case, when the apparatus is in its "desktop" mode, the services in the pre-specified set of services are represented in the output audio field by the stored audio labels without any need to first contact the services concerned; upon a user selecting a service and the apparatus changing to its service mode, the service access data for the selected service is used to contact that service for a full service feed.

With respect to the positioning of the service-representing sound sources in the audio field when the apparatus is in its desktop mode, each service may provide position information either indicating a suggested spatialised position in the audio field for the sound source(s) through which the service is to be represented, or giving a real-world location associated with the service (this may well be the case in respect of an augmented reality service associated with a location in the vicinity of the user). Where a set of services is pre-specified, then this position information can be stored in memory 14 along with the audio labels for the services concerned.

For each service-representing sound source, it is necessary to determine its final rendering position in the output audio field taking account of a number of factors. This is done by injecting a sound-source data item into a processing path involving elements 21 to 30. This sound-source data item comprises a sound source ID (such as the related suffixed service ID) for the sound source concerned, any service-supplied position information for the sound source, and possibly also the service type (general service/augmentation service). The subsystem 13 passes each sound-source data item to a source-position set/modify block 23 where the position of the sound source is decided relative to the audio-field reference vector, either automatically on the basis of the supplied type and/or position information, or from user input 24 provided through any suitable input device including a keypad, keyboard, voice recognition unit, or interactive display. These positions are constrained to conform to the desired form (spherical or part spherical; 1D, 2D, or 3D) of the audio field. The decided position for each source is then temporarily stored in memory 25 against the source ID.

Provision of a user input device for modifying the position of each sound source relative to the audio field reference, enables the user to modify the layout of the service-representing sound sources (that is, the dispositions of these sound sources relative to each other) as desired.

With respect to a service having an associated real-world location (typically, an augmented reality service), whilst it is possible to position the corresponding sound source in the audio field independently of the relationship between the associated real-world location of the service and the location of the user, it will often be desired to place the sound source in the field at a position determined by the associated real-world location and, in particular, in a position such that it lies in the same direction relative to the user as the associated real-world location. In this latter case, the audio field will generally be world-stabilised to maintain the directional validity of the sound source in the audio field presented to the user; for the same reason, user-commanded rotation of the audio field should be avoided or inhibited. Positioning a sound source according to an associated real-world location is achieved in the present apparatus by a real-world location processing functional block 21 that forms part of the source-position set/modify block 23. The real-world location processing functional block 21 is arranged to receive and store real-world locations passed to it from subsystem 13, these locations being stored against the corresponding source IDs. Block 21 is also supplied on input 22 with the current location of the user determined by any suitable means such as a GPS system carried by the user, or nearby location beacons (such as may be provided at point-of-sale locations). The block 21 first determines whether the real-world location associated with a service is close enough to the user to qualify the corresponding sound source for inclusion in the audio field; if this test is passed, the azimuth and elevation coordinates of the sound source are set to place the sound source in the audio field in a direction as perceived by the user corresponding to the direction of the real world location from the user. This requires knowledge of the real-world direction of pointing of the un-rotated audio-field reference vector 42 (which, as noted above, is also the direction of pointing of the presentation reference vector). This can be derived for example, by providing a small electronic compass on a structure carrying the audio output devices 11, since this enables the real-world direction of pointing of presentation reference vector 44 to be measured; by noting the rotation angle of the audio-field reference vector 42 at the moment the real-world direction of pointing of vector 44 is measured, it is then possible to derive the real-world direction of pointing of the audio-field reference vector 42 (assuming that the audio field is being world-stabilised). It may be noted that not only will there normally be a structure carrying the audio output devices 11 when these are constituted by headphones, but this is also the case in any mobile situation (for example, in a vehicle) where loudspeakers are involved.

If the audio field is a 3D field, then as well as setting the azimuth and elevation coordinates of the sound source to position it in the same direction as the associated real-world location, block 21 also sets a range coordinate value to represent the real world distance between the user and the real-world location associated with the sound source.

Of course, as the user moves in space, the block 21 must reprocess its stored real-world location information to update the position of the corresponding sound sources in the audio field. Similarly, if updated real-world location information is received from a service, then the positioning of the sound source in the audio field must also be updated.

Returning to a general consideration of the FIG. 1 apparatus, an audio-field orientation modify block 26 is used to specify any required changes in orientation (angular offset) of the audio-field reference vector relative to presentation reference vector. In the present example where the audio field is to be body-stabilized and the output audio devices are headphones, the apparatus includes the afore-mentioned head tracker sensor 33 and this sensor is arranged to provide a measure of the turning of a user's head relative to their body to a first input 27 of the block 26. This measure is combined with any user-commanded field rotation supplied to a second input of block 26 in order to derive a field orientation angle that is stored in memory 29.

As already noted, where headphones are used and the audio field is to be world stabilised (for example, where augmented-reality service sound sources are to be maintained in positions in the field consistent with their real world positions relative to the user), then the head-tracker sensor needs to detect any change in orientation of the user's head relative to the real world so that the audio field can be given a counter rotation. Where the user is travelling in a vehicle and the audio field is to be vehicle-stabilised, the rotation of the user's head is measured relative to the vehicle (the user's "local" world, as already noted).

Each source position stored in memory 25 is combined by combiner 30 with the field orientation (rotation) angle stored in memory 29 to derive a rendering position for the sound source, this rendering position being stored, along with the source ID, in memory 15.

The combiner operates continuously and cyclically to refresh the rendering positions in memory 15.

Output selection block 12 sets the current apparatus mode according to user input, the available modes being a desktop mode and a service mode as already discussed above. When the desktop mode is set, the spatialisation processor 10 accesses the rendering position memory 15 and the memory 14 holding the service audio labels to generate an audio field, via audio output devices 11, in which the (or the currently-specified) audio label associated with each sound source is spatialized to a position set by the corresponding rendering position in memory 15. In generating the audio-label field, the processor 10 can function asynchronously with respect to the combiner 30 due to the provision of memory 15. The spatialisation processor 10 operates according to any appropriate sound spatialisation method, including those mentioned in the introduction to the present specification. The spatialisation processor 10 and audio output devices together form a rendering subsystem serving to render each sound source at its derived final rendering position.

When the service mode is set, the full service audio feed for the chosen service is rendered by the spatialisation processor 10 according to whatever position information is provided by the service. It will be appreciated that, although not depicted, this service position information can be combined with the field orientation angle information stored in memory 29 to achieve the same stabilization as for the audio-field containing the service audio labels; however, this is not essential and, indeed, the inherent stabilization of the audio output devices (head-stabilised in the case of headphones) maybe more appropriate for the full service mode.

As an alternative to the full service feed being spatialised by the spatialisation processor 10, the full service feed may be provided as pre-spatialized audio signals and fed directly to the audio output devices.

Figure 4:
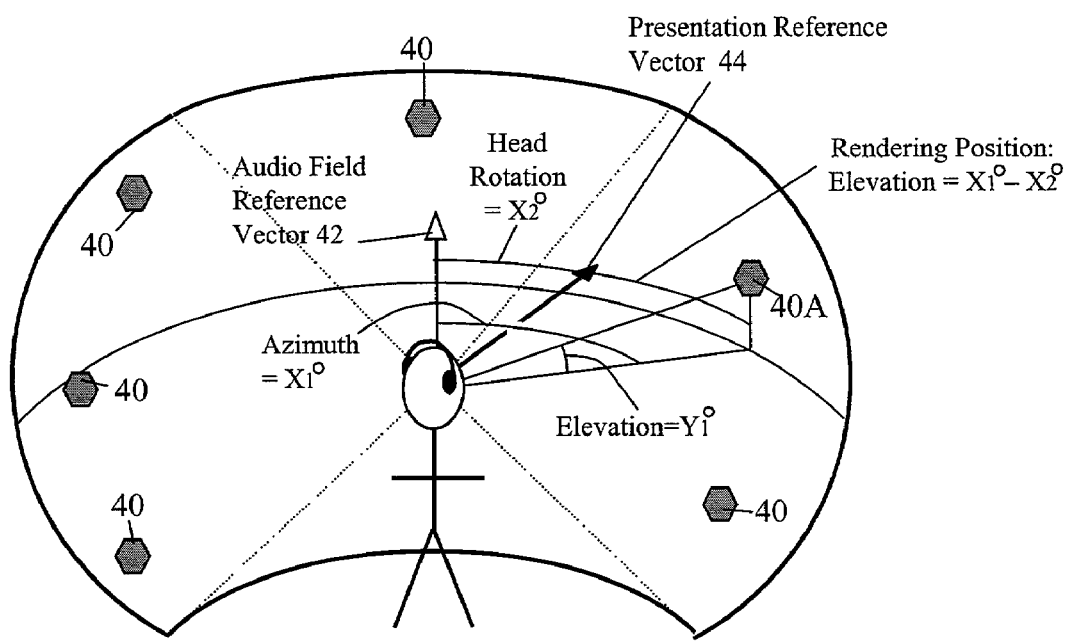
FIG. 4 is a diagram illustrating a user exploring a body-stabilized audio field by head rotation.

With the FIG. 1 apparatus set to provide a body-stabilised audio field through headphones, the user can explore the audio field in two ways, namely by turning their head and by rotating the audio field. FIG. 4 illustrates a user turning their head to explore a 2D audio field restricted to occupy part only of a spherical surface. In this case, six spatialised sound sources 40 are depicted. Of these sources, one source 40A is positioned in the audio field at an azimuth angle of X1° and elevation angle Y1° relative to the audio-field reference vector 42. The user has not commanded any explicit rotation of the audio field. However, the user has turned their head through an angle X2° towards the source 40A. In order to maintain body-stabilisation of the audio field, the audio-field reference vector 42 has been automatically rotated an angle (−X2°) relative to the presentation reference vector 44 to bring the vector 42 back in line with the user's body straight ahead direction; the rendering position of the source relative to the presentation reference vector is therefore:

Azimuth X1°−X2°

Elevation=Y1° this being the position output by combiner 30 and stored in memory 15. The result is that turning of the user's head does indeed have the effect of turning towards the sound source 40A.

Figure 5:
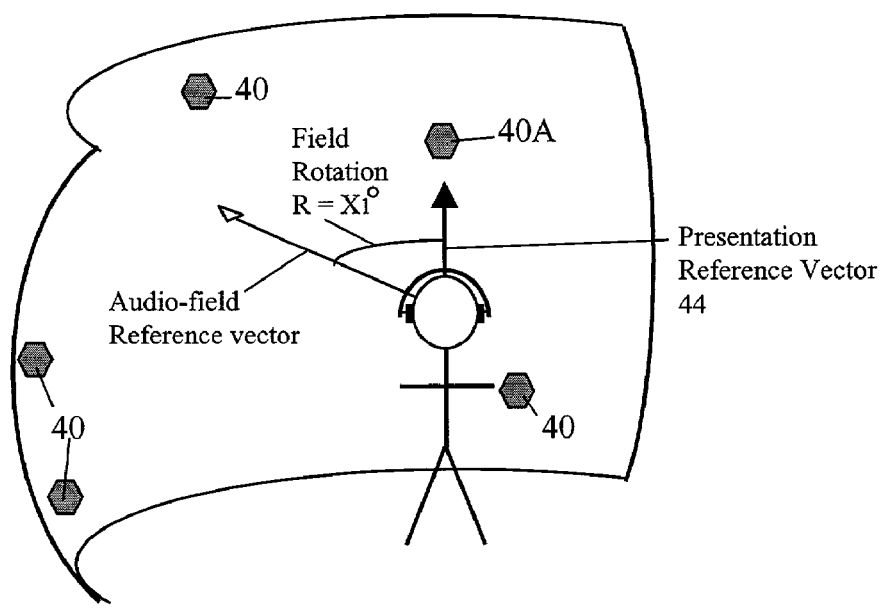
FIG. 5 is a diagram illustrating a user exploring a body-stabilized audio field by rotating the field in azimuth.

FIG. 5 illustrates, for the same audio field as represented in FIG. 4, how the user can bring the sound source 40A to a position directly ahead of the user by commanding a rotation of (−X1°) of the audio field by user input 28 to block 26 (effected, for example, by a rotary input device). The azimuth rendering position of the sound source 40A becomes (X1°−X1°), that is, 0°—the source 40A is therefore rendered in line with the presentation reference vector 44. Of course, if the user turns their head, the source 40A will cease to be directly in front of the user until the user faces ahead again.

Audio Field Organisation—Cylindrical Field Example

Figure 6:
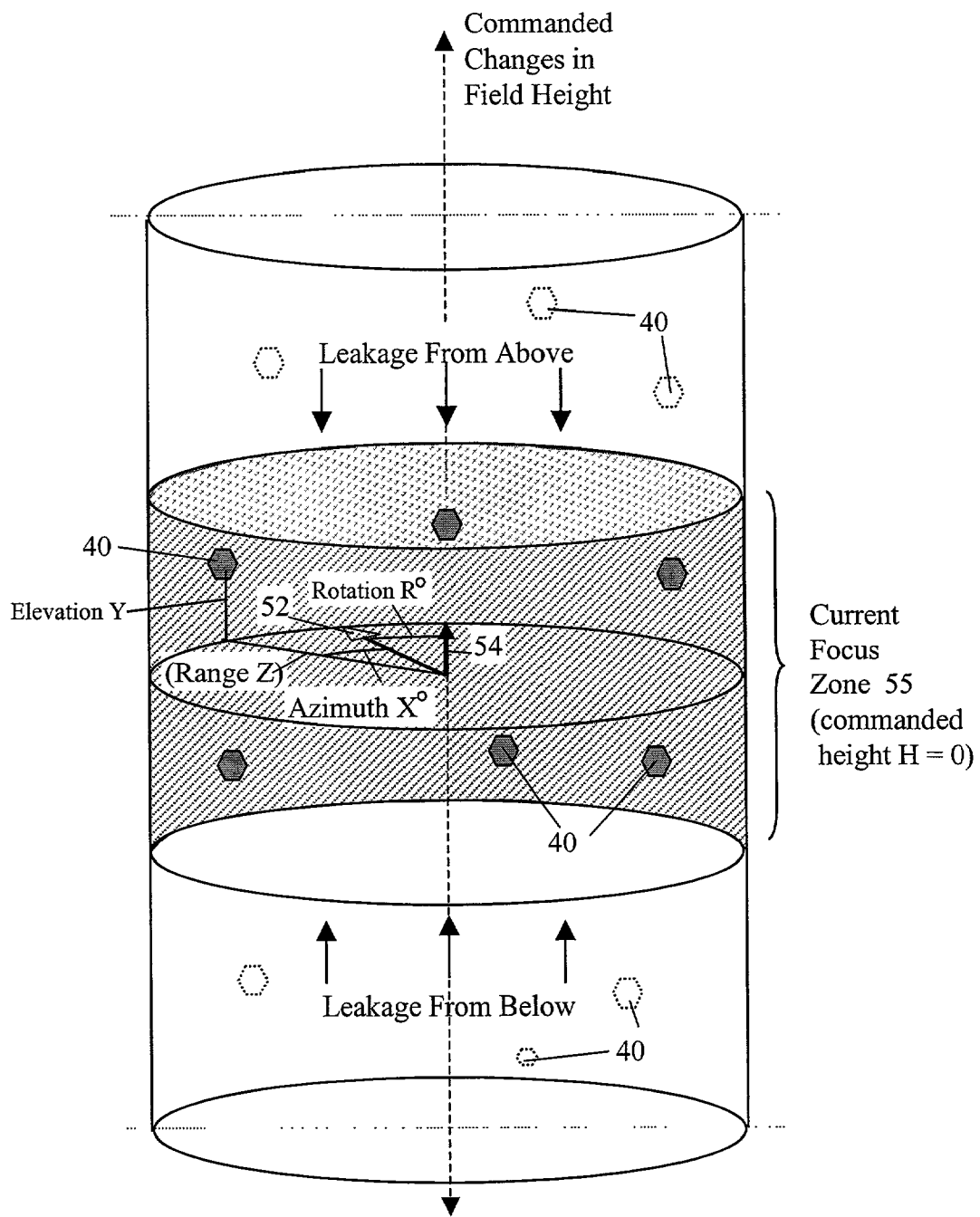
FIG. 6 is a diagram illustrating a general cylindrical organization of an audio field.

The FIG. 1 apparatus can be adapted to spatialize the sound sources 40 in an audio field conforming to the surface of a vertically-orientated cylinder (or part thereof). FIG. 6 depicts a general case where the audio field conforms to a notional cylindrical surface 50. This cylindrical audio field, like the spherical audio field previously described with reference to FIG. 2, is two dimensional inasmuch as the position of a sound source 40 in the field it can be specified by two coordinates, namely an azimuth angle X° and an elevation (height) distance Y, both measured relative to an horizontal audio-field reference vector 52. It will be appreciated that a 3D audio field can be specified by adding a range coordinate Z, this being the distance from the axis of the cylindrical audio field. As with the spherical audio field described above, the cylindrical audio field may be rotated (angularly offset by angle R°) relative to a presentation reference vector 54, this being done either in response to a direct user command or to achieve a particular field stabilisation in the same manner as already described above for the spherical audio field. In addition, the audio field can be axially displaced to change the height (axial offset) of the audio-field reference vector 52 relative to the presentation reference vector 54.

Since it is possible to accommodate any desired number of sound sources in the audio field without over crowding simply by extending the elevation axis, there is a real risk of a "Tower of Babel" being created if all sound sources are active together. Accordingly, the general model of FIG. 6 employs a concept of a focus zone 55 which is a zone of the cylindrical audio field bounded by upper and lower elevation values determined by a currently commanded height H so as to keep the focus zone fixed relative to the assumed user position (the origin of the presentation reference vector); within the focus zone, the sound sources 40 are active, whilst outside the zone the sources 40 are muted (depicted by dashing of the hexagon outline of these sources in FIG. 6) except for a limited audio leakage 56. In FIG. 6, the focus zone (which is hatched) extends by an amount C above and below the commanded height H (and thus has upper and lower elevation values of (H+C) and (H−C) respectively. In the illustrated example, H=0 and C is a constant; C need not be constant and it would be possible, for example, to make its value dependent on the value of the commanded height H.

Figure 7:
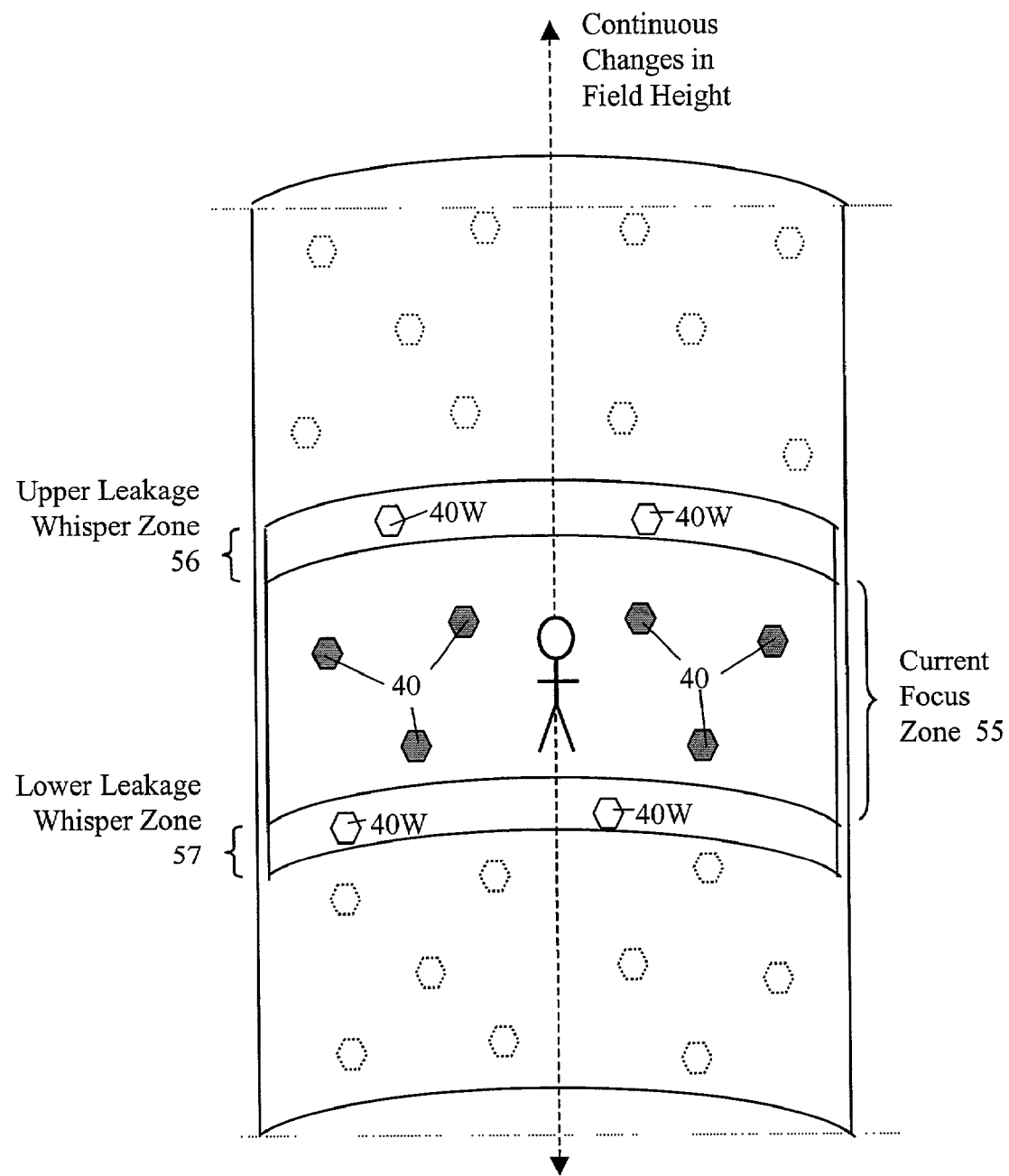
FIG. 7 is a diagram illustrating a first specific form of the FIG. 6 cylindrical organization.
Figure 8:
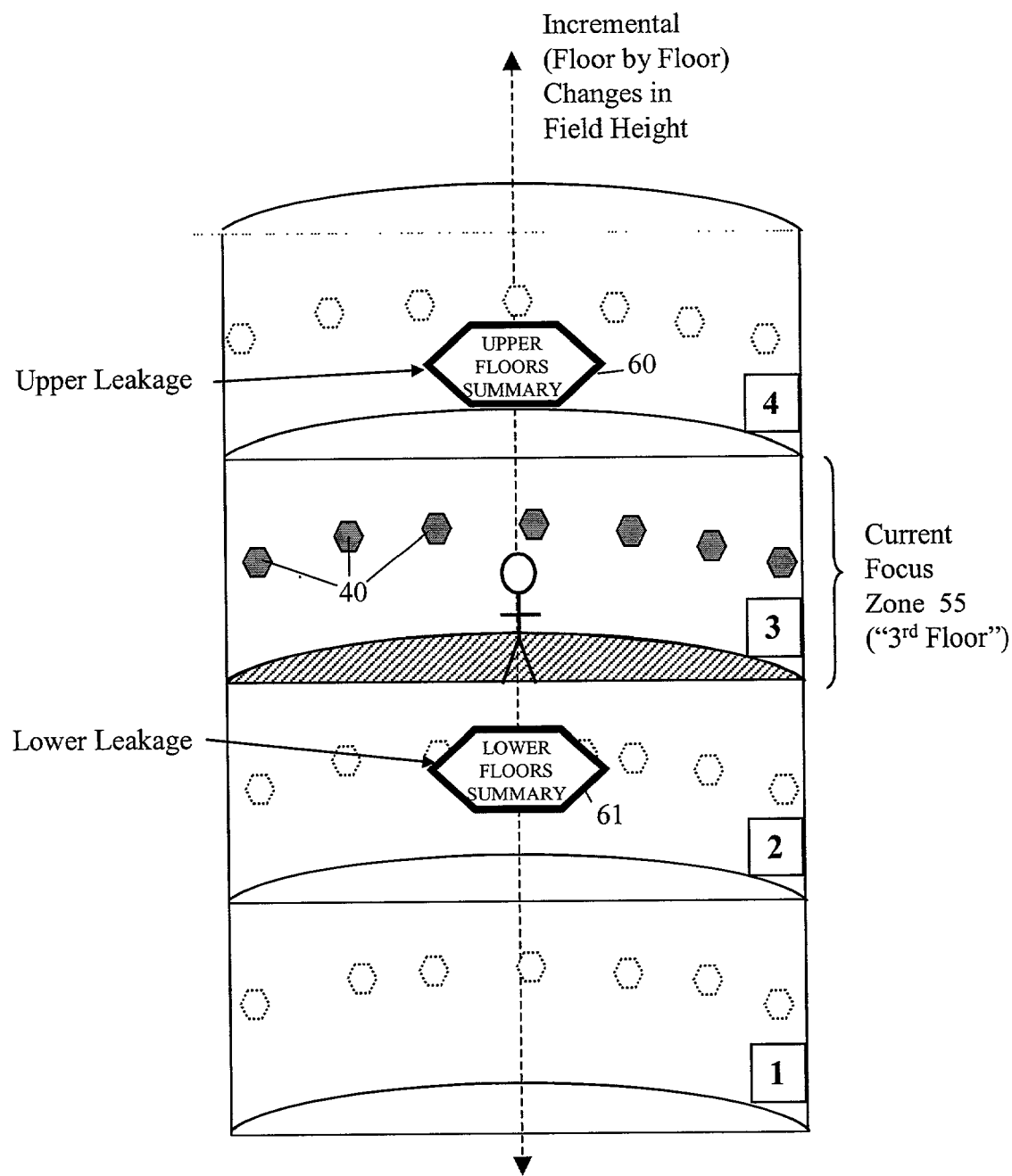
FIG. 8 is a diagram illustrating a second specific form of the FIG. 6 cylindrical organization.

The general form of cylindrical audio field shown in FIG. 6 can be implemented in a variety of ways with respect to how leakage into the focus zone is effected and how a user moves up and down the cylindrical field (that is, changes the commanded height and thus the current focus zone). FIGS. 7 and 8 illustrate two possible implementations in the case where the audio field is of semi-cylindrical form (azimuth range from +90° to −90°).

In FIG. 7, leakage takes the form of the low-volume presence of sound sources 40W in upper and lower "whisper" zones 56, 57 positioned adjacent the focus zone 55. Also, the commanded height value is continuously variable (as opposed to being variable in steps). The result is that the user can effectively slide up and down the cylinder and hear both the sound sources 40 in the focus zone and, at a lower volume, sound sources 40W in the whisper zones.

In FIG. 8, the service sound sources are organised to lie at a number of discrete heights, in this case, four possible heights effectively corresponding to four "floors" here labelled "1" to "4". Preferably, each "floor" contains sound sources associated with services all of the same type with different floors being associated with different service types. The user can only command step changes in height corresponding to moving from floor to floor (the extent of the focus zone encompassing one floor). Leakage takes the form of an upper and lower advisory sound source 60, 61 respectively positioned just above and just below the focus zone at an azimuth angle of 0°. Each of these advisory sound sources 60, 61 provides a summary of the services (for example, in terms of service types) available respectively above and below the current focus zone. This permits a user to determine whether they need to go up or down to find a desired service.

It will be appreciated that the forms of leakage used in FIGS. 7 and 8 can be interchanged or combined and that the FIG. 8 embodiment can provide for sound sources 40 on the same floor to reside at different heights on that floor. It is also possible to provide each floor of the FIG. 8 embodiment with a characteristic audio theme which rather than being associated with a particular source (which is, of course, possible) is arranged to surround the user with no directionality; by way of example, a floor containing museum services could have a classical music theme.

In arranging for the FIG. 1 apparatus to implement a cylindrical audio field such as depicted in any of FIGS. 4-6, the positions set for the sound sources by block 23 are specified in terms of the described cylindrical coordinate system and are chosen to conform to a cylindrical or part-cylindrical organisation in 1, 2, or 3D as required. The orientation and vertical positioning of the audio field reference vector 42 are set by block 26, also in terms of the cylindrical coordinate system. Similarly, combiner 30 is arranged to generate the sound-source rendering positions in terms of cylindrical coordinates. The spatialisation processor must therefore either be arranged to understand this coordinate system or the rendering positions must be converted to a coordinate system understood by the spatialisation processor 10 before they are passed to the processor. This latter approach is preferred and thus, in the present case, assuming that the spatialisation processor is arranged to operate in terms of the spherical coordinate system illustrated in FIG. 2, a converter 66 (see FIG. 9) is provided upstream of memory 15 to convert the rendering positions from cylindrical coordinates to spherical coordinates.

Whilst it would be possible to use a single coordinate system throughout the apparatus regardless of the form of audio field to be produced (for example, the positions of the sound sources in the cylindrical audio field could be specified in spherical coordinates), this complicates the processing because with an appropriately chosen coordinate system most operations are simple additions or subtractions applied independently to the individual coordinates values of the sound sources; in contrast, if, for example, a spherical coordinate system is used to specify the positions in a cylindrical field, then commanded changes in the field height (discussed further below) can no longer simply be added/subtracted to the sound source positions to derive their rendering heights but instead involve more complex processing affecting both elevation angle and range. Indeed, by appropriate choice of coordinate system for different forms of audio field, equivalent operations with respect to the fields translate to the same operations (generally add/subtract) on the coordinate values being used so that the operation of the elements 25, 26, 29 and 30 of the apparatus is unchanged. In this case, adapting the apparatus to a change in audio-field form, simple requires the block 23 to use an appropriate coordinate system and for converter 66 to be set to convert from that coordinate system to that used by the spatialisation processor 10.

With respect to adaptation of the FIG. 1 apparatus to provide the required capability of commanding changes in height for the cylindrical audio field systems illustrated in FIGS. 4–6, such height changes correspond to the commanding of changes in the elevation angle already described for the case of a spherical audio field. Thus, a height change command is supplied to the block 26 to set a field height value (an axial offset between the field reference vector and the presentation reference vector) which is then combined with the elevation distance value Y of each sound source to derive the elevation value for the rendering position of the source.

Figure 9:
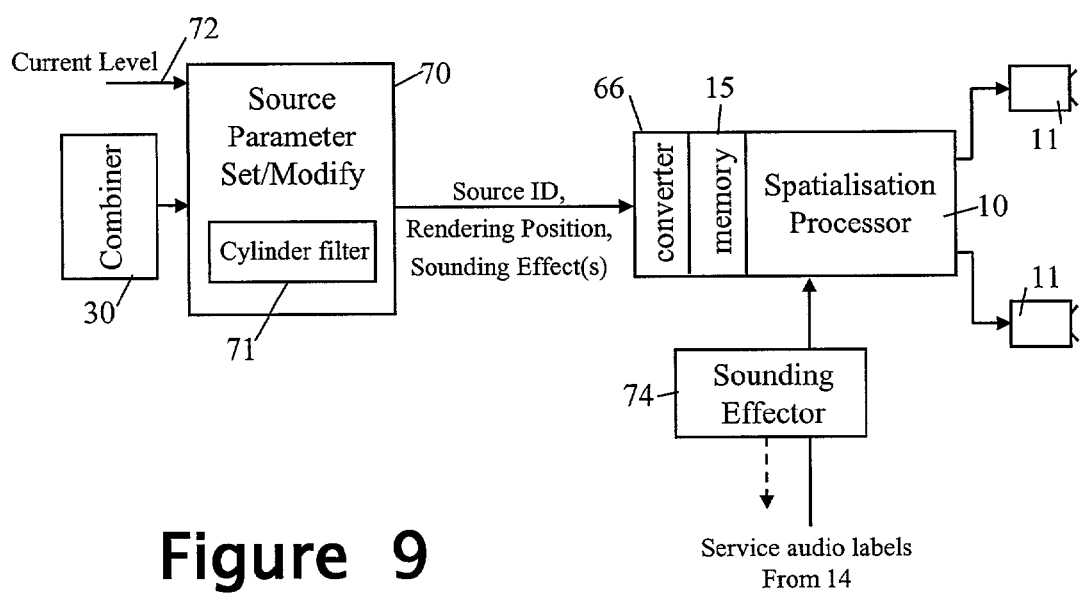
FIG. 9 is a functional block diagram of a variant of the FIG. 1 apparatus.

As regards how the focus zone and leakage features are implemented, FIG. 9 depicts a suitable variation of the FIG. 1 apparatus for providing these features. In particular, a source parameter set/modify block 70 is interposed between the output of combiner 30 and the converter 66. This block 70 comprises one or more units for setting and/or modifying one or more parameters associated with each sound source to condition how the sound source is to be presented in the audio field. As will be seen hereinafter with respect to the FIG. 10 apparatus, the block 70 can include a range of different type of units that may modify the rendering position of a source and/or set various sounding effect parameters for the source. In the present case, the block 70 comprises a cylindrical filter 71 that sets a audibility (volume level) sounding-effect parameter for each sound source. The set parameter value is passed to memory 15 for storage along with the source ID and rendering position. When the spatialisation processor comes to render the sound source audio label according to the position and audibility parameter value stored in memory 15, it passes the audibility value to a sounding effector 74 that conditions the audio label appropriately (in this case, sets its volume level).

In the case of the FIG. 7 arrangement, the cylinder filter 71 is responsive to the current field height value (as supplied from memory 29 to a reference input 72 of block 70) to set the audibility parameter value of each sound source: to 100% (no volume level reduction) for sound sources in the focus zone 55; to 50% for sound sources in the "whisper" zones 56 and 57; and to 0% (zero volume) for all other sound sources. As a result, the sounding effector 74 mutes out all sound sources not in the focus or whisper zones, and reduces the volume level of sound sources in the whisper zones.

In the case of the FIG. 8 arrangement, the cylinder filter 71 performs a similar function except that now there are no whisper zones. As regards the upper and lower advisory sound sources 60 and 61, the subsystem 13 effectively creates these sources by:

creating a ghost advisory service in memory 14 with two sound sources, the IDs of these sources being passed to block 23 as for any other service;

creating for each sound source a respective set of summary audio labels, each set being stored in memory 14 and specifying for each floor an appropriate label summarising the service types either above or below the current floor, depending on the set concerned.

The source IDs passed to the block 23 are there associated with null position data before being passed on via memory 25 and combiner 30 to arrive at the cylinder filter 71 of block 70. The filter 71 recognises the source IDs as upper and lower advisory sound source IDs and appropriately sets position data for them as well as setting the audibility parameter to 100% and setting a parameter specifying which summary audio label is appropriate for the current floor. This enables the spatialisation processor to retrieve the appropriate audio label when it comes to render the upper or lower advisory sound source.

It will be appreciated that partially or fully muting sound sources outside of a focus zone can also be done where the apparatus is set to generate a spherical audio field. In this case, the apparatus includes blocks 70 and 74 but now the cylinder filter 71 is replaced by a "spherical filter" muting out all sound sources beyond a specified angular distance from a current facing direction of the user. The current facing direction relative to the presentation reference vector is derived by block 26 and supplied to the filter 71. It maybe noted that in the case where the audio output devices 11 are constituted by headphones, the direction of facing of the user corresponds to the presentation reference vector so it is a simple matter to determine which sound sources have rendering positions that are more than a given angular displacement from the facing direction. Along with the implementation of a focus zone for a spherical audio field, it is, of course, also possible to provide the described implementations of a leakage feature.

Multiple Audio Sub-Fields

Figure 10:
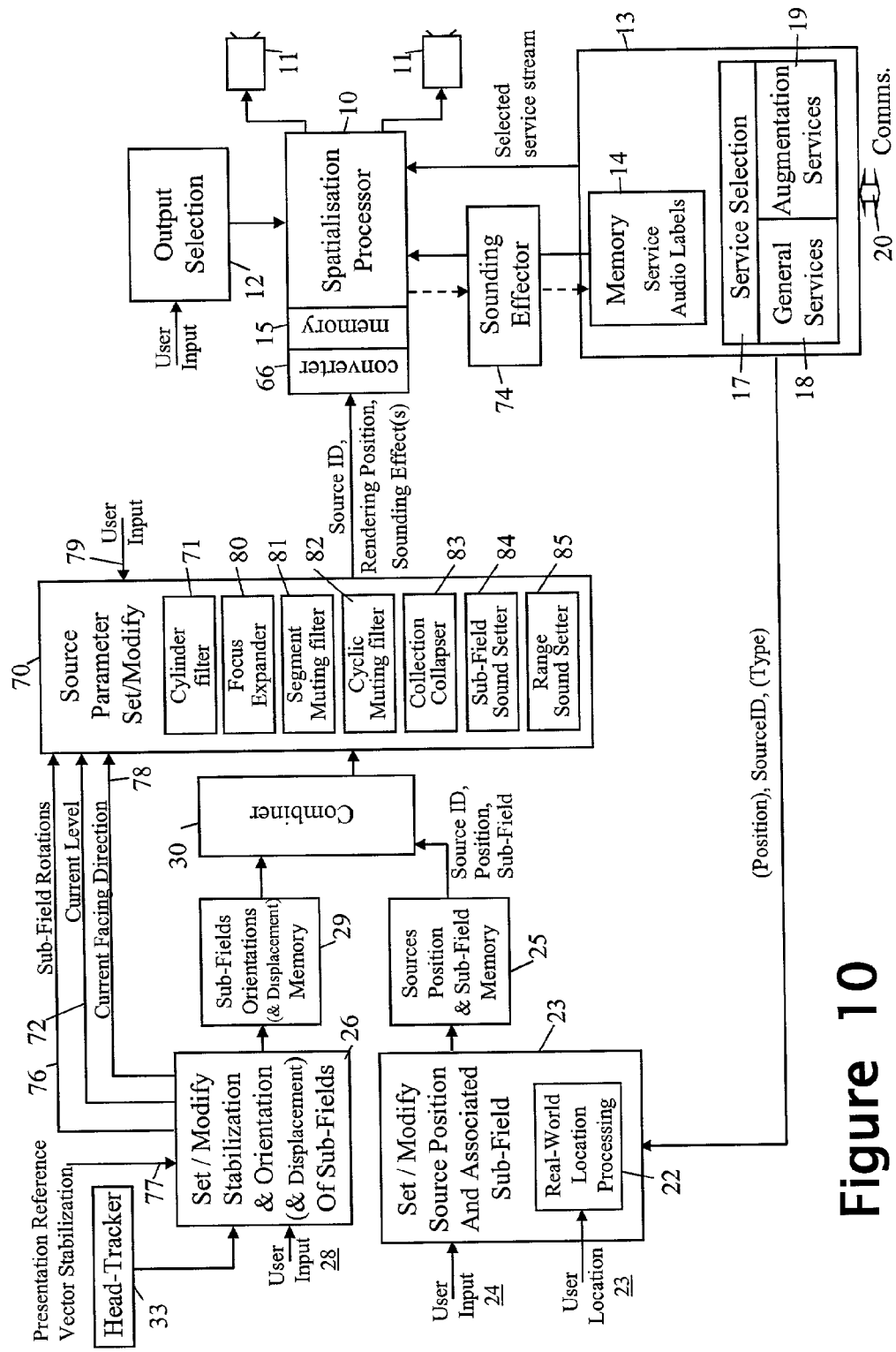
FIG. 10 is a functional block diagram of a second audio-field generating apparatus.

FIG. 10 shows a second apparatus for producing an audio field to serve as an audio interface to services. This apparatus is similar to the FIG. 9 variant of the first apparatus but provides for multiple audio "sub-fields" and has a variety of sound-source parameter conditioning units for facilitating a clear audio presentation. Elements of the first and second apparatus that have similar functionality have been given the same reference numerals and their description will not be repeated below for the second apparatus except where there is modification of functionality to accommodate features of the second apparatus.

The second apparatus, like the first apparatus, is capable of producing (part) spherical or part (cylindrical) 1D, 2D or 3D audio fields (or, indeed, any other form of audio field) according to the positions set for the sound sources by block 23.

As mentioned, the FIG. 10 apparatus provides for multiple "sub-fields". Each sub-field may be considered as an independent audio field that can be rotated (and, in the case of a cylindrical field, vertically re-positioned) by changing the offset between the presentation reference vector and an audio-field reference specific to the sub-field. Further, each sub-field can have a different stabilization set for it—thus, for example, sound sources representing general services can be assigned to a head-stabilised sub-field whilst sound sources representing augmented-reality services can be assigned to a world-stabilised sub-field. The rotation/displacement of each sub-field and the setting of its stabilization is done by block 26 with the resultant values being stored in memory 29. Whether or not the block 26 modifies the azimuth-angle value of a sub-field to reflect a sensed rotation of the user's head will thus depend on the stabilization set for the sub-field and, as already described, on whether the audio output devices are head-mounted, body-mounted, vehicle-mounted or fixed with respect to the world (or, in other words, whether the presentation reference vector is head, body, vehicle or world stabilised). To add flexibility to the FIG. 10 apparatus, the current stabilisation of the presentation reference vector is fed to the block (see arrow) to enable the latter to make any appropriate changes to the sub-field orientations as the user turns (and/or nods) their head.

Each service sound source is assigned by block 23 to a particular sub-field and an identifier of its assigned sub-field is stored with the source ID in memory 25 along with the position of the sound source relative to the audio-field reference associated with the assigned sub-field. The combiner 30 is supplied from memory 29 with the rotation/displacement values of each sub-field and for each service sound source combines the values of the related sub-field with the sound-source coordinate values; as a result, each sound source is imparted the rotations/displacements experienced by its sub-field. For each service sound source, the output of the combiner comprises source ID, position data, and sub-field identifier.

As will be seen below, assigning sound sources to different sub-fields may be done for reasons other than giving them different stabilizations; for example, it may be done to identify a group of service sound sources that are to be subject to a particular source-parameter modification process in block 70.

It should also be noted that different sub-fields may have different dimensions and even different forms so that one sub-field could be a 2D spherical surface whilst another sub-field could be of 3D cylindrical form.

Facilitating Clear Presentation

As well as the cylindrical filter 71, the source parameter set/modify block 70 includes a number of sound-source parameter conditioning units 80 to 85 for facilitating a clear audio presentation. The function of each of these units will be described more fully below. It is to be understood that the units need not all be present or operational together and various combinations of one or more units being concurrently active are possible; however, not all combinations are appropriate but this is a matter easily judged and will not be exhaustively detailed below. Also, certain units may need to effect their processing before others (for example, units that affect the final rendering position of a sound source need to effect their processing before units that set sounding effect parameters in dependence on the final rendering position of a sound source); again, it will generally be apparent when such ordering issues are present and what ordering of the units is required to resolve such issues and an exhaustive treatment of these matters will not be given below.

Figure 11:
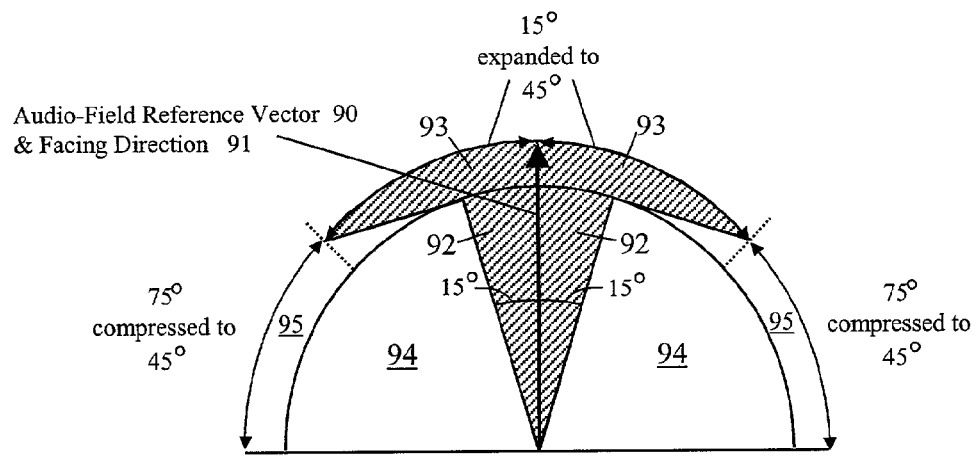
FIG. 11 is a diagram illustrating the operation of a focus expander of the FIG. 10 apparatus to expand an audio field, the user facing in the same direction as an audio field reference vector.

Unit 80 is a focus expander that serves to modify the rendering positions of the sound sources to spread out the sound sources (that is, expand or dilate the audio field) in azimuth in the region of the current direction of facing of the user (or other appropriate direction) in order to facilitate discrimination between sound sources. Referring to FIG. 11, this shows a field of 180° extent in azimuth with the user currently facing in the direction of the audio-field reference vector 90. The focus expander 80 operates to linearly expand the 15° segments 92 on both sides of the facing direction 91 into respective 45° segments 93 (see the hatched zones). The remaining segments are correspondingly compressed to maintain an overall 180° azimuth range—in this case, this results in two 75° segments 94 being compressed into respective 45° segments 95; as an alternative (not illustrated), the remaining segments could simply be angularly displaced from their normal positions without compressing them.

For sub-fields that are head-stabilised, turning of the user's head does not change the 15° segments subject to expansion; however, azimuth rotation of such a sub-field does result in the expansion being applied to different segments of the sub-field.

Figure 12:
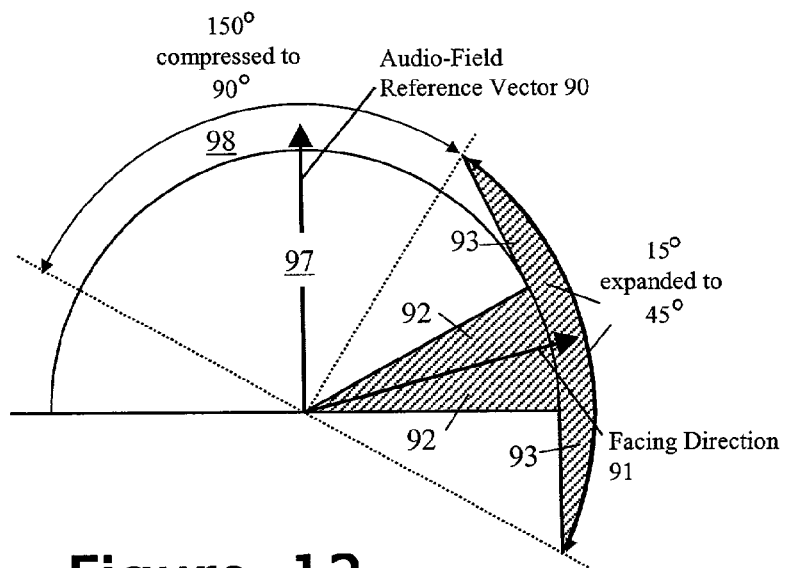
FIG. 12 is a further diagram illustrating the operation of the focus expander, the user in this case facing in a different direction to the audio field reference vector.

For sub-fields that are not head-stabilised, as the user turns their head, the segments subject to expansion change. This is illustrated in FIG. 12 where a user has turned to the right 75° relative to the audio-field reference vector of a body-stabilised audio sub-field with an initial ±90° range either side of the reference vector. This results in the most clockwise 30° of the original field (segments 92) being expanded (symmetrically with respect to the facing direction) so that now the audio sub-field extends round further in the clockwise direction than before. The remaining 150° segment 97 of the original audio sub-field is expanded into a 90° segment 98.

In order for the focus expander 80 to effect the required processing of the azimuth rendering positions of the sound sources, it is supplied (input 78 to block 70) with the angle of the facing direction relative to the current presentation reference vector, this angle being determined by the block 26 in dependence on the current stabilization of the presentation reference vector and the sensed head rotation. Of course, where the presentation reference vector is head-stabilized (i.e. headphones are being used), the angle between the facing direction and the presentation reference vector will be zero; in other cases it will generally correspond to the angle measured by the head-tracker sensor 33. Given the facing direction angle relative to the presentation reference vector, and bearing in mind that the sound-source positions supplied to block 70 are relative to that vector, it is a straightforward matter for the focus expander 80 to determine which sound sources lie within the segments 92 and then make the required changes to the azimuth values of the sound-source rendering positions of these sources in order to achieve the desired audio-field dilation; similarly, the rendering positions of the other sound sources are adjusted as required.

It will be appreciated that the user can be enabled to turn the focus expander 80 on and off as desired. It is also possible to arrange for the focus expander to be applied only to one or more selected sub-fields rather than to all fields indiscriminately. Furthermore, whilst the focus expander has been described above as operating on azimuth angles, it could additionally or alternatively be caused to act on the elevation coordinate values (whether angles or distances). Again, whilst the expansion has been described above as being uniform (linear), it could be applied in a non-linear manner such that a larger expansion is applied adjacent the facing direction than further away. The angle of application of the expansion effect can also be made adjustable.

Rather than the focus expander 80 expanding a region of the audio field set relative to the current facing direction, the focus expander can be arranged to expand a region set relative to some other direction (the 'focus reference direction'), such as a specific world-stabilised direction or the presentation reference vector. In this case, the focus expander is provided with appropriate information from block 26 to enable it to determine the relative offset between the focus reference direction and the presentation reference vector (this offset being, of course, zero if the focus reference direction is set to be the presentation reference vector).

Arrow 79 in FIG. 10 generally represents user input to block 70 whether for controlling the focus expander 80 or any other of the units of the block. How the user input is derived is an implementation detail and may, for example, be done by selection buttons, a graphical user interface, or voice command input subsystem.

Figure 13:
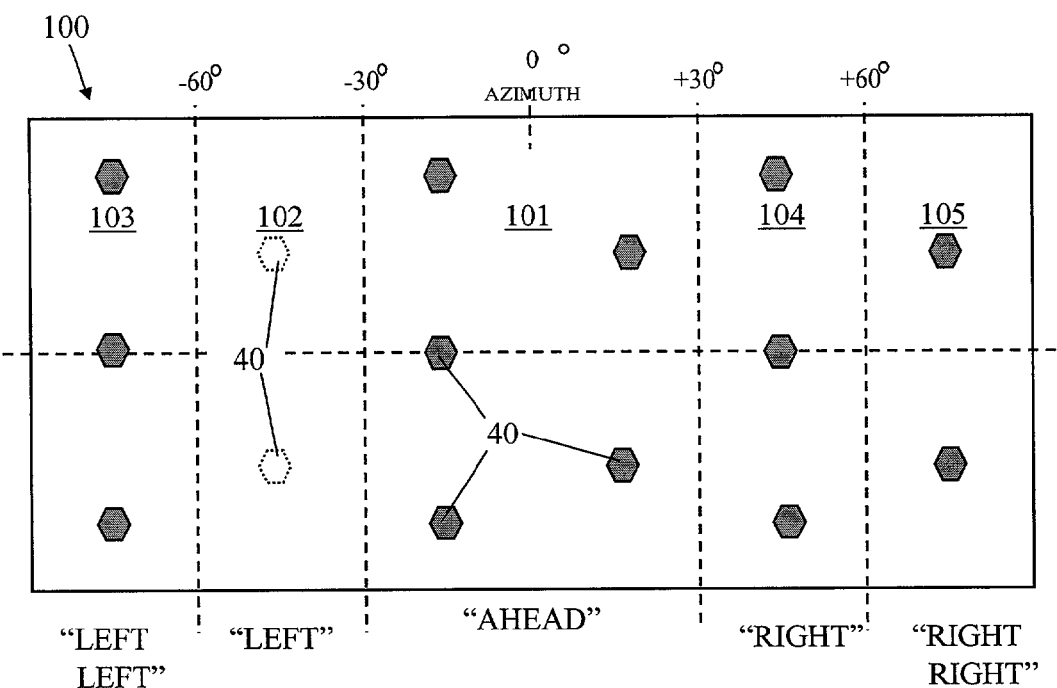
FIG. 13 is a diagram illustrating the operation of a segment muting filter of the FIG. 10 apparatus.

Unit 81 of the source-parameter set/modify block 70 is a segment muting filter 81 that is operative to change the audibility state of sound sources in user-specified segments of one, some or all the audio sub-fields (a default of all sub-fields is preferably set in the filter 81 with the possibility of the user changing this default). In particular, the segment muting filter changes the audibility state of segment sound sources (in either direction) between un-muted and at least partially muted by appropriately setting the value of an audibility (sound volume) parameter of the sound sources. FIG. 13 illustrates the effect of the segment muting filter in respect of an audio sub-field, of 180° azimuth extent, shown developed into a rectangular form 100 and with spatialised sound sources 40. In this example, the audio field is divided into five segments relative to the audio-field reference vector, namely:

- an "ahead" segment 101 extending in azimuth from +30° to −30°;
- a "left" segment 102 extending in azimuth from −30° to −60°;
- a "far left" segment 103 extending in azimuth from −60° to −90°;
- a "right" segment 104 extending in azimuth from +30° to +60°;
- a "far right" segment 105 extending in azimuth from +60° to +90°.

The filter 81 acts to change the audibility parameter of each sound source in a segment back and forth between 100% and 0% (or a preset low level) in response to user input. Preferably, speech form input is possible so that to mute sound sources in segment 102, the user need only say "Mute Left" (FIG. 13 depicts these sounds sources as muted by showing them in dashed outline). To bring back these sound sources to full volume, the user says "Un-Mute Left". As already described with respect to the cylindrical filter 71, the sound volume specified by the audibility parameter is implemented by sounding effector 74, the effector being passed the parameter when the spatialisation processor 10 requests to be supplied with the sound label for the sound source concerned.

Preferably, the segments can be muted and un-muted independently of each other. An alternative is to arrange for only one segment to be muted at a time with the selection for muting of a segment automatically un-muting any previously muted segment; the opposite is also possible with only one segment being un-muted at a time, the un-muting of a segment causing any previously un-muted segment to be muted. It is also possible to arrange for several segments to be muted simultaneously in response to a single command—for example, both the "left" and "far left" segments 102, 103 in FIG. 13 could be arranged to be muted in response to a user command of "Mute All Left".

The segments are pre-specified in terms of their azimuth angular extent relative to the audio-field reference vectors by segmentation data stored in the segment muting filter or elsewhere. In order for the segment muting filter to mute the sound sources corresponding to a segment to be muted, the filter needs to know the current azimuth angle between the audio field reference vectors and the presentation reference vector since the sound-source azimuth angles provided to the filter are relative to the latter vector. The required angles between the audio-field and presentation reference vectors is supplied on input 76 from block 26 to block 70.

As an alternative to the segments being specified relative to the audio-field reference vectors, the segments can be specified relative to the facing direction of the user (which may, in fact, be more natural). In this case, the segment muting filter needs to know the angle between the current facing direction and the presentation reference vector; as already described, this angle is provided on input 78 to block 70. A further alternative is to pre-specify the segments relative to the presentation reference vector (which, of course, for headphones is the same as specifying the segments relative to the user's facing direction).

Whilst segment muting has been described using segmentation in azimuth, it will be appreciated that the segmentation can be effected in any appropriate manner (for example, in azimuth and elevation in combination) and the term 'segment' is herein used without any connotation regarding the form or shape encompassed.

Rather than a segment remaining muted until commanded to return to its un-muted state, a muted segment can be arranged only to stay muted for a limited period and then to automatically revert to being un-muted.

Figure 14:
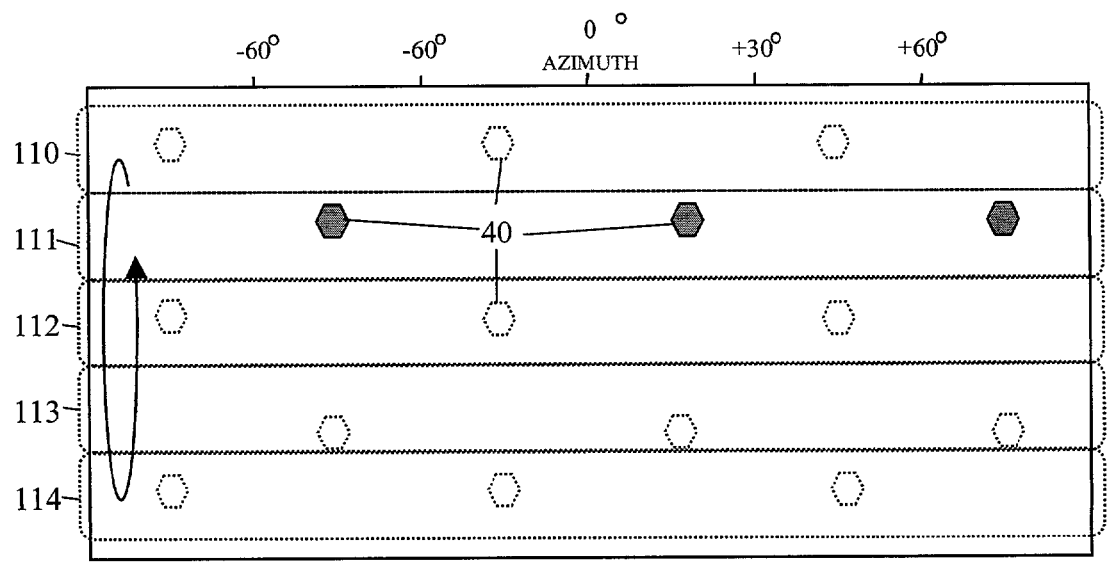
FIG. 14 is a diagram illustrating the operation of a cyclic muting filter of the FIG. 10 apparatus.

Unit 82 is a cyclic muting filter. As depicted in FIG. 14 (which uses the same field development as FIG. 13), this filter 82 works on the basis that the sound sources 40 are divided into groups 110 to 114 and the filter 82 operates cyclically to change the audibility state of the sound sources so as to at least partially mute out all but one group of sources in turn—in FIG. 14, all groups except group 111 are currently muted. The un-muted group remains un-muted, for example, for 10 seconds before being muted (partially or fully) again. As with the segment muting filter, the filter 82 operates by setting the value of an audibility parameter of each sound source. Rather than requiring a group ID to be assigned to each sound source and transferred along with the sound-source ID, position data, and sub-field identifier to the block 70, grouping can be achieved by assigning a separate sub-field for each group.

The grouping of sound sources can be effected automatically by service type (or more generally, one or more characteristics associated with the item represented by the sound source concerned). Alternatively, the grouping of the sound sources can be effected automatically according to their positions in the audio field (possibly taking account their relation to the presentation reference vector, the audio field reference vectors, or user direction of facing). A further possibility is for the grouping to be user specified (via block 23). In one possible grouping arrangement, each sound source is assigned to a respective group resulting in each sound source being un-muted in turn. Preferably, the user can also specify that one or more groups are not subject to cyclic muting. Additionally, the user can be given the option of setting the un-muted duration for each group.

As already indicated, muted groups need not be fully muted. Where the sound sources are assigned to groups according to their positions, a possible muting pattern would be to fully mute sound sources in groups lying either side of the currently un-muted group of sources, and to partially mute the sound sources of all other groups.

Rather than the un-muting and muting of the groups being effected in an abrupt manner, the group whose limited period of being un-muted is ending can be cross-faded with the group whose period of being un-muted is next to occur.

Unit 82 is a collection collapser the basic purpose of which is to respond to a predetermined user command to collapse all sound sources that are members of a specified collection of sound sources to a single collection-representing sound source at a particular location (which can be head, body, vehicle or world stabilised). The member sound sources of the collection can be identified by a specific tag associated with each sound source ID; however, it is convenient to assign all sound sources to be collapsed to the same sub-field and simply rely on the sub-field ID to identify these sources to the block 70.

Figure 15:
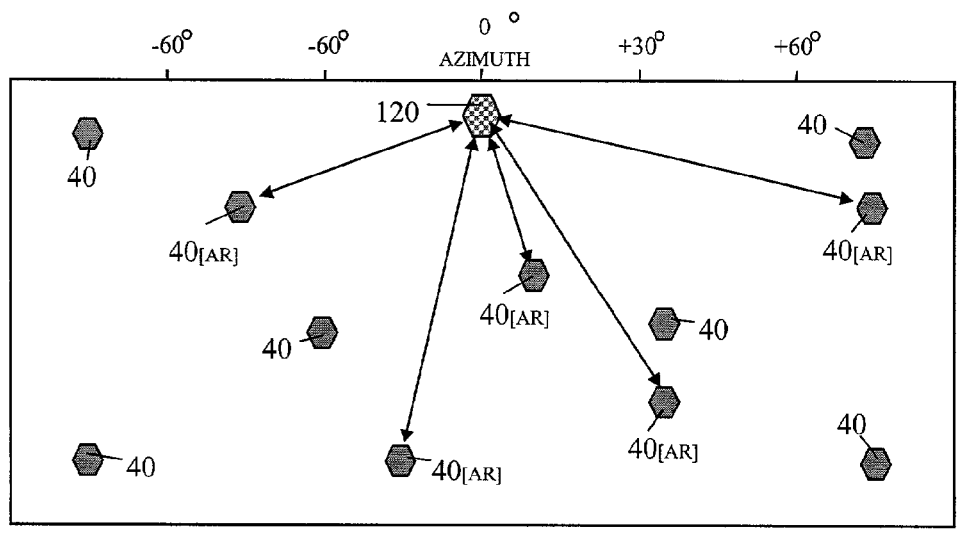
FIG. 15 is a diagram illustrating the operation of a collection collapser of the FIG. 10 apparatus.

FIG. 15 illustrates the general effect of the collection collapser 82 for a situation where all augmented-reality sound sources 40[AR] are members of the same collection and have been assigned to the same world-stabilised sub-field; these augmented-reality sound sources are arranged to be collapsed to a single collection-representing sound source 120 positioned at the top center of the audio sub-field. Other positions for the source 120 are, of course, possible such as in line with the current direction of facing or the location of a particular one of the sound sources being collapsed.

The collection collapser is further arranged to reverse the collapsing upon receipt of a suitable user command. The collection-representing sound source 120 will generally not be present when the member sound sources of the collection are un-collapsed though it is possible to leave the collection-representing sound source un-muted to serve, for example, as notification channel to inform the user of events relevant to the collection as a whole.

In a typical implementation, the collection-representing sound source is created by the subsystem 13 and is given an ID that indicates its special role; this sound source is then assigned to the same sub-field as the collection member sound sources to be collapsed. The collection-representing sound source is also given its own audio label stored in memory 14 with this label being arranged to be temporarily substituted for by any notifications generated in relation to the collection member sound sources (each sound source is also arranged to have its normal label temporarily replaced by any notification related to that source). Whilst the collection member sound sources are not collapsed, the audibility parameters of these sound sources remain at 100% but the collection-representing sound source has its audibility parameter set to 0% by the collection collapser. However, when the collection collapser 83 is triggered to collapse the collection member sound sources, these sources have their audibility parameters set to 0% whilst that of the collection-representing source is set to 100% thereby replacing the collapsed sources with a single sound source emitting the corresponding audio label (potentially periodically interrupted by notifications from the services associated with the collapsed sources). On user command, the collapsed sound sources are un-muted and the collection-representing sound source muted, thereby restoring the collection to its un-collapsed state.

Instead of the audio label used for the collection-representing sound source being a simple descriptor of the collection, the audio label can be constituted by an audio summation of one or more of the audio labels (or part thereof) of the collection member sound sources (as already noted, such audio labels as well as being simple verbal descriptors can alternatively be audio streams from the associated services). Where the label comprises audio labels (or extracts) from multiple member sound sources, the "cocktail party" effect enables a user to distinguish useful information. The relative volumes of the component sounds may be chosen based on a predetermined selection algorithm.

Rather than the collection changing from its un-collapsed state to its collapsed state in response to user command, the collection collapser can be arranged to effect this change automatically—for example, if there has been no activity in respect of any member sound source (user service request/service-originating event notification) for a predetermined period of time, then the collection collapser can be arranged to automatically put the collection in its collapsed state. Similarly, the collection collapser can automatically un-collapse the collection in response, for example, to the receipt of more than a threshold number of service event notifications within a given time, or upon the user entering a particular environment (in the case of a mobile user provided with means for detecting the user's environment either by location or in some other manner).

To provide clear feedback to the user as to what is occurring when the collection is being collapsed and un-collapsed, the collection collapser is preferably arranged to change the collection between its two states non-instantaneously and with the accompaniment of appropriate audible effects. For example, during collapse, the collection-representing sound source can be faded up as the collection-member sound sources are faded out. This can be accompanied by a sound such as a sucking in sound to indicate that the member sound sources are notionally being absorbed into the collection-representing sound source. Alternatively, the locations of the member sound sources can be moved over a second or two to the location of the collection-representing sound source. The reverse effects can be implemented when the collection is un-collapsed.

It may in certain circumstances to have more than one collection-representing sound source associated with a collection.

As regards the non-collection sound sources (if any) in the audio field, these are typically left un-disturbed by changes in the state of the collection. However, it would alternatively be possible to arrange for such sound sources to be modified to adapt to the presence or absence of the collection member sound sources. For example, upon un-collapsing of the collection, the location of any sound source close to where a member sound source appears in the audio field can be changed to ensure a minimum separation of sound sources. As another example, upon un-collapsing of the collection the other sound sources can be partially muted, at least temporarily.

It will be appreciated that the collection collapser provides more than just a way of opening an audio menu where the member sound sources represent menu list items; in particular, the distribution of the collection member sound sources in the un-collapsed collection is not constrained to that of a list but is determined by other considerations (for example, where the sound sources represent augmented reality services, by the real-world locations of these services).

Unit 84 is a sub-field sound setter intended to set a sounding effect parameter in respect of sound sources of a particular sub-field or sub-fields. The sound setter is operative to set a particular sounding effect parameter as either on or off for each sound source, whilst the sounding effector 74 is arranged to apply the corresponding sound effect to all sound sources for which the parameter is set to on. Preferably, as default, when the sound setter is enabled the sound sources of all sub-fields have the related sounding effect parameter set to on; however, the user can de-select one or more sub-fields for this treatment, as desired. In fact, multiple different sound setters 84 can be provided, each associated with a different sound effect. Typical sound effects are volume or pitch modulation, frequency shifting, distortion (such as bandwidth limiting or muffling), echo, addition of noise or other distinctive sounds, etc.

One reason to employ the sound setter 84 is to make it easy to distinguish one type of service from another or to distinguish the synthesised sound sources from real sound sources in the environment. In this latter case, the audio output devices are, of course, configured to permit the user to hear both real-world sounds as well as the synthesised sounds.

The user is preferably enabled to choose, via appropriate input means, what sound effect is to be used to make the synthesised sounds distinct; advantageously, the user can also choose to apply or remove the selected sound effect.

In fact, another way of distinguishing between one group of sounds and another (such as real and synthesised sounds) is by way of specifying a particular stabilization for a sub-field(s) containing one of the group of sound sources to be distinguished. Thus, audio labels for augmented-reality services can be distinguished from real world sounds by assigning the audio-label sound sources to a head-stabilised field so that they move relative to the real world as the user turns their head. As another example, the audio labels of general services could be assigned to a head-stabilised sub-field and the audio labels of augmented-reality services to a world-stabilised sub-field. As a refinement to always applying the same stabilization to a particular sub-field, the block 26 can be arranged to apply a stabilization scheme in which the sub-field is only updated periodically to a specified underlying stabilization, no account being taken between updates of any changes in orientation of the user's body or head (thereby automatically applying the stabilization associated with the presentation reference vector between updates).

Unit 85 is a range sound setter and is applicable only where an audio sub-field has depth (that is, the range parameter can be different for different sound sources of the sub-field). The range sound setter, when enabled in respect of a sub-field, is operative, for each sound-source in the sub-field, to set a sound source parameter according to the range of the sound source. The purpose of doing this is to impart an audible characteristic to the sound source that indicates to the user at least a general range of the sound source. This parameter could, for example, be the audibility parameter with the value of this parameter being set such that sound sources at a greater range are presented at a lower volume. However, in a preferred embodiment, the value of the parameter controlled by unit 85 is used to select which audio label to render from a set of audio labels associated with a sound source, each label having a different presentation character at least one aspect of which, other than or additional to loudness, differs between labels. This aspect is, for example, speaking style, vocabulary, speaker voice, etc. The mere change in a range value included in an announcement is not considered to be a change in the presentation character of the announcement.

Figure 16:
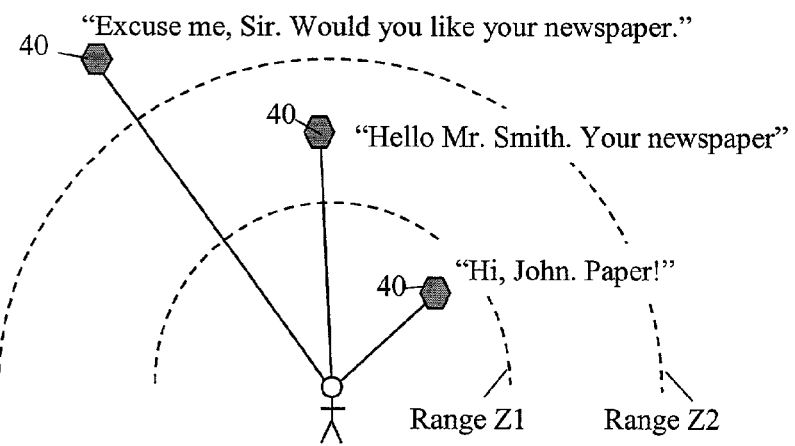
FIG. 16 is a diagram illustrating the operation of a range sound setter of the FIG. 10 apparatus.

The user can readily learn to associate the differing presentation characters with particular range bands. FIG. 16 illustrates an example concerning a sound source for an augmented-reality notification service from the user's local newspaper shop; this service sound source has three associated audio labels, stored for it in memory 14, of increasing familiarity the closer the sound source is to the user:

| Range extent | Audio label |
|---|---|
| >Z2 | "Excuse me Sir, would you like your newspaper?" |
| Z1–Z2 | "Hello Mr Smith, your newspaper" |
| 0–Z1 | "Hi, John. Paper!" |

The unit 85 sets a label-selection parameter for the sound source according to its range and the relevant label is then used by the spatialisation processor 10. Assuming that the newspaper notification service has indicated the real-world location of the newspaper shop to the apparatus, the processing block 22 can continuously update the position of the notification-service sound source in the audio field to reflect the movement of the user in the vicinity of the shop. As a result, the notification audio label will change as the user approaches the shop (or moves further away). Preferably, of course, the notification-service sound source is assigned to a world-stabilized sub-field with the position of the service sound source being set to be in the same direction for the user as the shop itself.

In a variant of the arrangement described above, rather than the sound sources presenting audio labels for services that have associated real-world locations, the sound sources can be arranged to present audio labels for real world entities with real-world locations, the range of the sound sources in the audio field being typically, though not necessarily, set to represent the actual distance between the user and the real-world location of the entity concerned. Indeed, the concept of using announcements each of a different character to indicate distance between the user and a sound source can be applied whatever entity, real or virtual, is being represented by the sound source; in this context the term "virtual entity" means any non-real-world entity such as a service, a data item, or application.

The concept of using announcements each of a different character to indicate distance can be further applied to situations beyond the current context of a spatialised audio field. For example, user-carried equipment can simply be arranged to make a succession of non-spatialised audio announcements, each with a differing presentation character, as the user approaches a particular real-world location or a device in relation to which range measurements can be made in any suitable manner.

Figure 17:
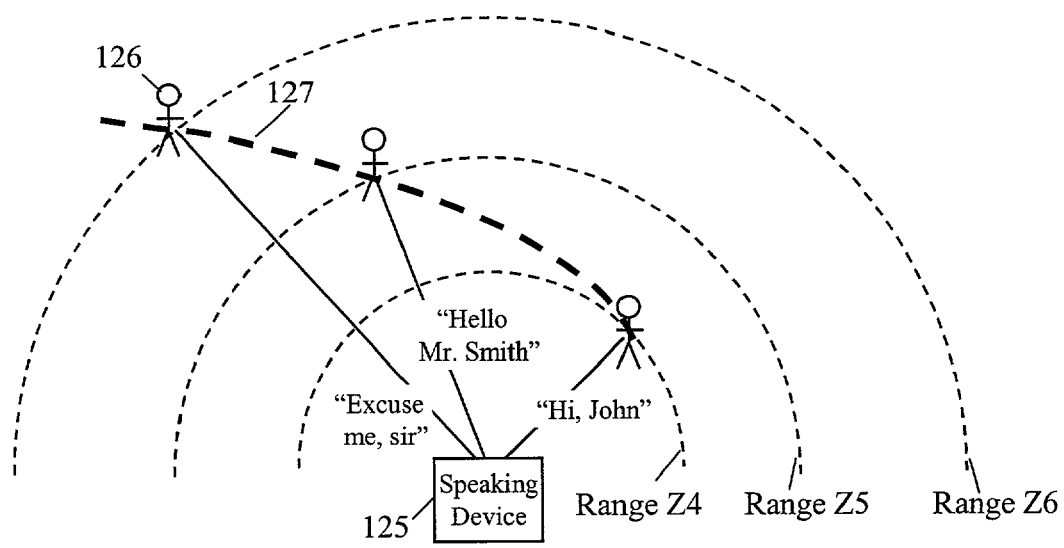
FIG. 17 is a diagram illustrating the concept of the range sound setter applied to a context of a fixed device being approached by a person.

FIG. 17 shows a further example beyond the context of a spatialised audio field. In this example, a fixed device 125 with speech output capability is arranged to sense the approach of a person 126. As the person 126 moves closer to the device 125 (the user's movement track is represented by dashed line 127 in FIG. 17), the range of the user from the device crosses range trigger values Z6, Z5 and Z4 (in decreasing range order) triggering a respective audio announcement having a range-dependent character. As with the FIG. 16 arrangement, the formality of each announcement decreases with distance (this merely being illustrative of one way in which range changes can be indicated to the person 126). The sensing of the distance between person 126 and device 125 can be done in any suitable manner such as by using fixed sensors, round-trip time measurements for signals sent from the device and returned by equipment carried by person 126 (with known internal processing delay), by a local radio location system interacting with equipment carried by person 126, etc.—in general terms, range determination is done by range-determining equipment at one of the entity, the user, and generally in the environment, either alone or in cooperation with auxiliary range-determining equipment at another of the entity, the user, and generally in the environment.

If a data communication path exists between the device 125 and equipment carried by the user (for example, via a wireless LAN or a Bluetooth link), then the announcements made by the device can be pre-specified by person 126 and sent to the device 125 (together with personal data such as the person's name). Such a communication path can also be used to send a range measurement made by the equipment to the device, thereby obviating the need for the latter to make the range measurement. Alternatively, where announcements are held by the person-carried equipment, range data can be passed from the device 125 to the equipment to trigger playing of the appropriate announcement by the latter.

Further variants involve announcement data being sent from the device 125 to the equipment carried by person 126 for use by that equipment. The sending of this announcement data can be triggered by person 126 crossing a range trigger value as measured by device 125 (the data sent being for the corresponding announcement); alternatively the appropriate announcement can be requested from the device 125 as the person-carried equipment determines that it has crossed a range trigger value. In another variant, data on all announcements can be sent from the device when the person is first detected and in this case range-dependent triggering of the playing of the announcements can be effected based on range measurements made by either the device, the person-carried equipment, or a system in the local environment.

Additionally or alternatively to the announcements being made when triggered by a range trigger value being reached, the announcements can be made at periodic intervals, the announcement used being dependent on the current range between user and the device 125.

In the foregoing examples related to FIG. 17, where the device 125 announces its presence through announcements made by the user-carried equipment, this latter can be understood as acting as a proxy for the device 125 (regardless of whether the announcement phrasing is in first-person device-related terms or in third person terms). Rather than having user-carried equipment act a proxy for device 125, equipment (typically fixed) in the local environment but not specific to the device 125, can be arranged to act as an announcement proxy for the device. In this latter case, the announcement (stored in one of the local-environment equipment, user-carried equipment, and the device 125, and retrieved to the local-environment equipment as required) is preferably made either without any specific directional character or such as to appear to the user to be coming from the device 125 itself (which is more complex to achieve as this approach needs to know the user's location relative to the equipment and to adapt to changes in this location as the user moves). As already indicated above, equipment in the local environment can also be used to determine the range between the user and device 125 in which case it can additionally be used to determine the appropriate announcement and either retrieve (and use) it itself or inform the device 125 or user-carried equipment (which ever is to make the announcement) which announcement to use.

As an alternative to storing multiple announcements each with a different presentation character and selecting the announcement appropriate for the current range value, a single announcement can be stored to which a presentation character appropriate to the current range is applied—for example, where the announcement is stored as text data for conversion to speech via text-to-speech converter, the voice data used by the text-to-speech converter can be selected according to range so that the voice in which the announcement is made changes with range.

Selecting a Sound Source in the Audio Field

A variety of different techniques can be used to select a particular sound source from those present in an audio field generated by the first or second apparatus described above. Three specific selection techniques will now be described with reference to FIG. 18 which shows further detail of the second apparatus (though it is to be understood that the techniques are equally applicable to the first apparatus); the general character of each of the selection techniques to be described is as follows:

1.)—rotation/displacement of the audio field to bring the sound source to be selected to a particular selection direction with respect to the user;

2.)—moving an audio cursor to coincide with the sound source to be selected;

3.)—speech input with restricted recogniser search space.

It will be appreciated that the apparatus need only be provided with one selection technique although providing alternative techniques adds to the versatility of the apparatus.

Figure 18:
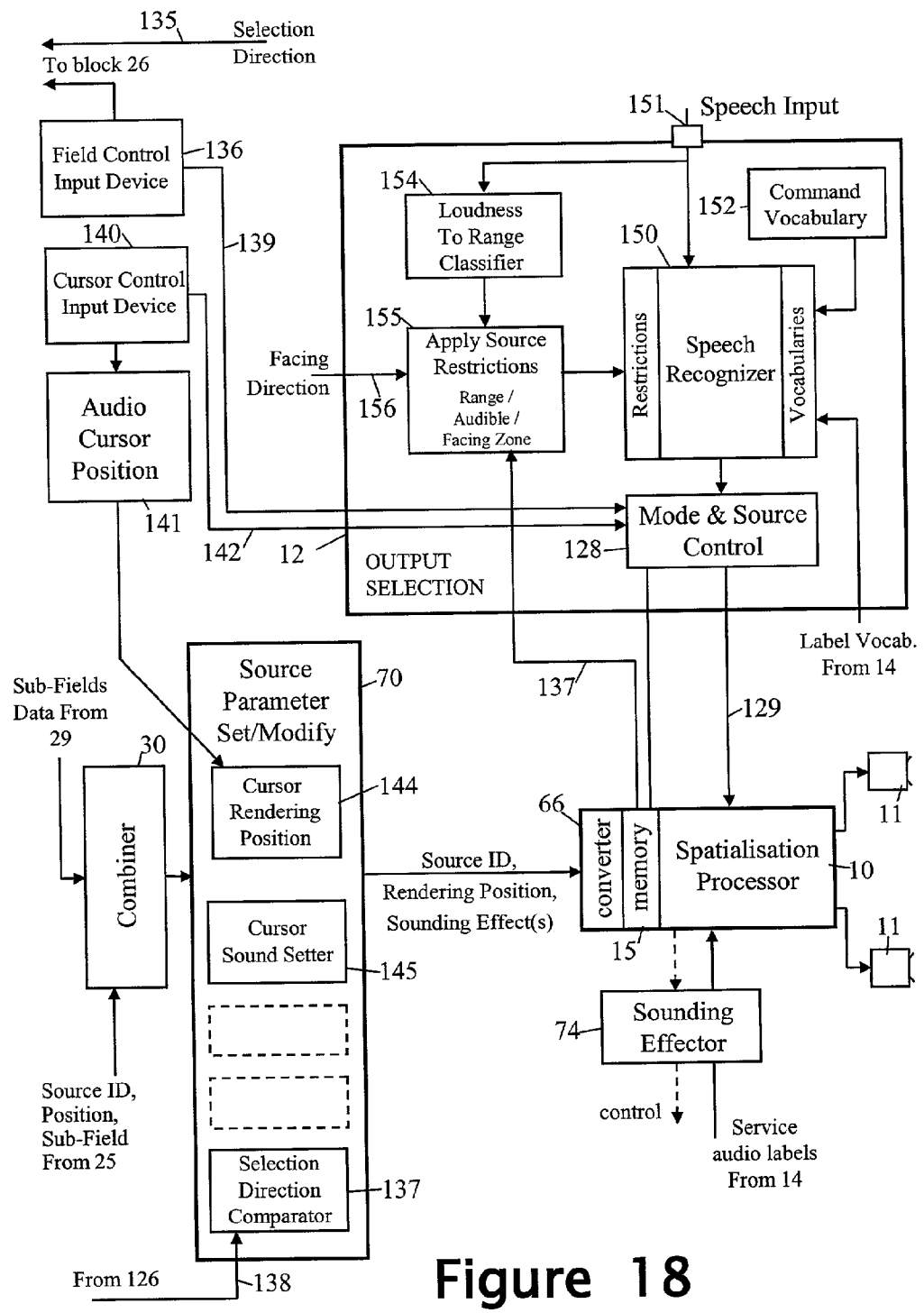
FIG. 18 is a functional block diagram showing further detail of the FIG. 10 apparatus.

With respect to the first technique, it is convenient to define a selection direction as being the horizontal straight-ahead facing direction of the user, though any other convenient direction could be chosen such as the actual current facing direction or that of the presentation reference vector. An indication of the chosen selection direction is supplied on input 135 to block 26 (this input 135, but not the block 26, is shown in FIG. 18). As already described, the user can rotate/displace the audio field by inputs to block 26 (on input 28 shown in FIG. 10), these inputs being generated by input device 136 (FIG. 18). This input device can take any suitable form, for example, a manually-operable device or a voice-input device set to recognise appropriate commands. For a 2D spherical field, the apparatus is arranged to permit control of both the azimuth angle and elevation angle of the audio-field reference vector relative to the presentation reference vector; for a 2D cylindrical field, the apparatus is set to permit control both of the azimuth angle of the field and of its height (elevation). This permits any point (and thus any sound source) in the field to be brought into line with the predetermined selection direction by rotations/displacement commanded by input device 136.

A selection-direction comparison unit 137 of the source parameter set/modify block 70 is fed with an input 138 from block 26 indicating the angular offset between the selection direction and the presentation reference direction (this offset is readily determined by block 26 from the inputs it receives). Given this information, unit 137 determines if any sound source in the audio field lies in the selection direction (or within a defined angular distance of it) and, if so, sets a selection parameter of that sound source to 'true', resetting the parameter to 'false' upon the sound source ceasing to be in alignment with the selection direction. The unit 137 operates on basis of the rendering position of each sound source after any processing by other units of block 70 that may affect the rendering position of that sound source. The unit 137 may also set a sounding effect parameter for the sound source to give a distinctive sound for that source in order to indicate to the user when a sound source lies in the selection direction.

The input device 136 as well as enabling the user to rotate/displace the audio field, also enables the user to indicate that a sound source lying in the selection direction is to be selected. This indication is generated, for example, using a selection button or upon recognition of a command word such as 'select', and results in a corresponding signal being fed on line 139 to a mode and source control block 128 of the output selection block 12. On receiving this signal, block 128 accesses the memory 15 to determine which sound source, if any, currently has its selection parameter set to 'true'; provided such a source is identified, the block 128 switches the apparatus from its desktop mode to its service mode and instructs the spatialisation processor 10 on line 129 to output a full service feed for the identified service sound source.

It may be noted that when the apparatus is in its desktop mode, at any given moment some of the sound sources may be in a fully muted state due to operation of units of the source parameter set/modify block 70. Since it is unlikely that a user will intentionally be trying to select such a muted source, when the mode and source control block 128 accesses memory 15 to identify a sound source lying in the selection direction, it is preferably arranged to ignore any muted sound source, notwithstanding that the source lies in the selection direction.

The fact that the FIG. 10 permits the presence of multiple sub-fields has two consequences for the above-described selection technique. Firstly, it will generally be desirable for the input device 136 to be able to rotate/displace any desired one of the sub-fields independently of the others; however, when the user wishes to move a sound source to lie in the selection direction, it is simplest to arrange for all sub-fields to be moved together by device 136. Secondly, with multiple sub fields that are independently movable, it is possible that multiple sound sources can lie in the selection direction at the same time; in order to cope with this, block 128 can operate any suitable prioritisation scheme to choose between such sound sources or can present the choice of sources to the user to allow the user to select the desired one of the sources lying in the selection direction.

With regard to the selection direction comparator unit 137 setting a sounding effect parameter to give an audible indication to the user when a sound source lies in the selection direction, the operation of unit 137 can be refined also to adjust a sounding effect parameter to indicate when a sound source is near the selection direction, the adjustment to the sound effect being such as to provide an indication of the direction in which the sound source needs to be moved to come into alignment with the selection direction.

The second selection technique to be described uses an audio cursor. This cursor is a special sound source that is arranged to be rotated/displaced by a cursor control input device 140 which, like input device 136, can take any suitable form; indeed, devices 136 and 140 can be combined with a mode control for switching between the respective functions of the two devices. For the FIG. 10 apparatus, one straight-forward way of implementing the audio cursor is as a sound source aligned with the audio-field reference vector of a dedicated sub-field; in this case, the output of the cursor control input device is fed to block 26 to rotate/displace that sub-field (from which it can be readily seen that the function of input device 140 can easily be effected by input device 136). Preferably, the audio-cursor sub-field is arranged not to move with the other sub-fields and to be body stabilised. An alternative audio cursor implementation is for the input device 140 to directly set the position of the audio-cursor sound source relative to the presentation reference vector, this being the implementation depicted in FIG. 18 where a block 141 uses the output from device 140 to calculate the current cursor position. With either implementation, the current rendering position of the cursor is fed to the source parameter set/modify block 70 where it is stored in a memory 144.

A cursor sound setter unit 145 of block 70 compares the position of the cursor against the final rendering position of each sound source (the unit 145, like the unit 137, is thus arranged to operate using the rendering position of each sound source after any processing by other units of block 70 that may affect the rendering position of that sound source). If no sound source is close to the cursor's current position, a cursor-sound parameter is set to a corresponding value and is passed, along with the cursor ID and rendering position, via the converter 66 to memory 15. The spatialisation processor, in conjunction with sound effector 74, then causes a distinctive cursor sound to be generated at the appropriate position in the audio field, the nature of the sound being such as to indicate to the user that the cursor is not close to another sound source. The sounding effector 74 is preferably arranged to provide the cursor sound without the need to refer to the subsystem 13, this variation from the treatment of the cursor as the other sound sources being justified by the special status of the cursor sound source.

Upon the unit 145 determining that the cursor is close to a sound source (that is, within a threshold distance which is preferably settable by the user), it sets the cursor-sound parameter for the cursor to indicate this for example by setting it to a value that is dependent on the direction of the source relative to the cursor. The sounding effector 74 then causes the cursor sound to be correspondingly adapted to indicate this relative direction to the user, for example:

| Relative Positions | Cursor Sound |
| --- | --- |
| Sound Source above cursor | Alternating high-frequency dots and dashes |
| Sound Source below cursor | Alternating low-frequency dots and dashes |
| Sound Source to left of cursor | Middle-frequency dots |
| Sound Source to right of cursor | Middle-frequency dashes |

As an alternative, appropriate words could be used ('above', 'below', 'left', 'right') repeated at a low volume level.

The distance between a sound source and the cursor can also be indicated audibly such that it is possible to tell whether the cursor is getting closer to, or further from, the sound source. Thus, in the case of the above example using dots and dashes, the repetition rate of the dots and dashes can be increased as the cursor moves closer to a sound source and decrease as the cursor moves away; alternatively, the separation distance can be indicated by appropriate words.

Thus, in general terms, the cursor sounds are modified to provide an audible indication of when the cursor is close to a sound source with this indication being preferably set to indicate the distance and/or direction of the sound source.

When the cursor coincides with a sound source (at least in terms of their direction from a user reference location), the unit 145 sets the cursor-sound parameter to a further value which the sounding effector 74 translates to another unique sound such as rapid beeping. Unit 145 also sets to 'true' a selection parameter of the sound source to indicate its coincidence with the cursor. If the user now indicates, using input device 140, that the sound source is to be selected, a corresponding signal is sent on line 142 to the mode and source control block 128. As with the first selection technique, this causes block 128 to access memory 15 to determine which sound source has its selection parameter set to 'true' before switching the apparatus to its service mode in which a full service feed of the selected service sound source is enabled.

The block 128 can be arranged to handle muted sources and multiple sources at the cursor position in the same way as it handled the corresponding situations for the first selection technique.

The unit 145 can be arranged not only to set the selection parameter of the sound source pointed to by the cursor, but also to set the value of a sounding effect parameter of any sound source determined by unit to be close to, or in line with, the audio cursor so that the sounds emanating from that sound source are adapted by the sounding effector 74 (including, potentially by the adding in of extra sounds or words) to indicate the closeness (and, optionally, distance to) the audio cursor; thus, for example, the volume or pitch of the sound source, or the degree of application of a vibrato or echo effect to the sound source, could be increased as the cursor approached the sound source (and decreased as their separation increased). The relative direction of the cursor from the sound source (or the reverse direction) can also be indicated by sounds or words output from the sound source.

Thus, in general terms, the sounds emanating from the sound source are modified to also provide an audible indication of when the cursor is close to the sound source with this indication being preferably set to indicate the distance and/or direction of the sound source.

The foregoing modification of sounds emanating from a sound source near the cursor can be done as an alternative to, or additionally to, setting the cursor-sound parameter to indicate sound-source closeness distance/direction.; in other words, the audible indication produced when the cursor is close to a sound source can be provided via the cursor and/or the sound source. As an example of providing a respective component of this audible indication from the sound source and the cursor, the sounds emanating from the sound source can be modified to indicate the proximity of the cursor and their separation distance, whilst the cursor sound source can be used to indicate the direction of the sound source; with this arrangement, where there are several sound sources within the closeness threshold of the cursor, the sound sources indicate this closeness by the sounds they emit whilst the cursor indicates the direction to the closest sound source.

Where the audio sub-fields are of 3D form, it is possible to arrange for the audio cursor to be moved in the third (range) dimension. This can most conveniently done where, as shown in FIG. 18, the cursor-control input device 140 is used to directly set the cursor position relative to the presentation reference vector; in this case, the input device is simply further arranged to set the range of the audio cursor and this range value is stored in memory 144. In order to provide the user with an indication of the range of the audio cursor, the cursor sound setter unit 145 is preferably arranged to set the value of a sounding effect parameter of the cursor according to the current range of the cursor (regardless of the proximity of any sound source), the sounding effector 74 then producing a correspondingly modified sound for the cursor. For example, where the sounding effector produces a tone to represent the cursor, the volume of the tone can be adjusted, via an audibility parameter, to reflect the current range position of the cursor (the greater the range, the quieter the cursor sounds). Alternatively, the frequency of the cursor tone can be varied with the current range of the cursor.

It may be noted that the focus expander 80 can conveniently be linked to the audio cursor to expand the region of the audio field about the cursor rather than about the current direction of facing of the user as was earlier described. In this case, the unit 80 is supplied with the current cursor position from memory 144 rather than with the current facing direction of the user.

The third selection technique is based on the use of a speech recogniser 150 to determine when the user is speaking the sound label of a sound source, the speaking of such a label being taken to be an indication that the user wishes to select the source.

Speech recogniser 150 has speech input 151 and associated vocabularies that define the words between which the recogniser is to distinguish. In the present case, the vocabularies associated with the speech recogniser include a command vocabulary (stored in memory 152) holding command words such as "desktop" (to return to the desktop mode); "louder" and "softer" (to generally increase and decrease volume levels); "rotate left", "rotate right", "up", "down" (where sub-field rotation is to be effected by spoken command), numbers 1 to 10 (to identify sub-fields), etc. The audio labels held in memory 14 also define a vocabulary for the recogniser, the phonetic contents of the label words being made available to the recogniser through an appropriate reference database (not shown). In the event that a sound source has its associated label constituted by an audio feed from the source or by non-word sounds, then the label memory is preferably arranged to store appropriate words that the user might use to select the source, these words being advantageously supplied by the related service when first selected by subsystem 13.

Figure 19:
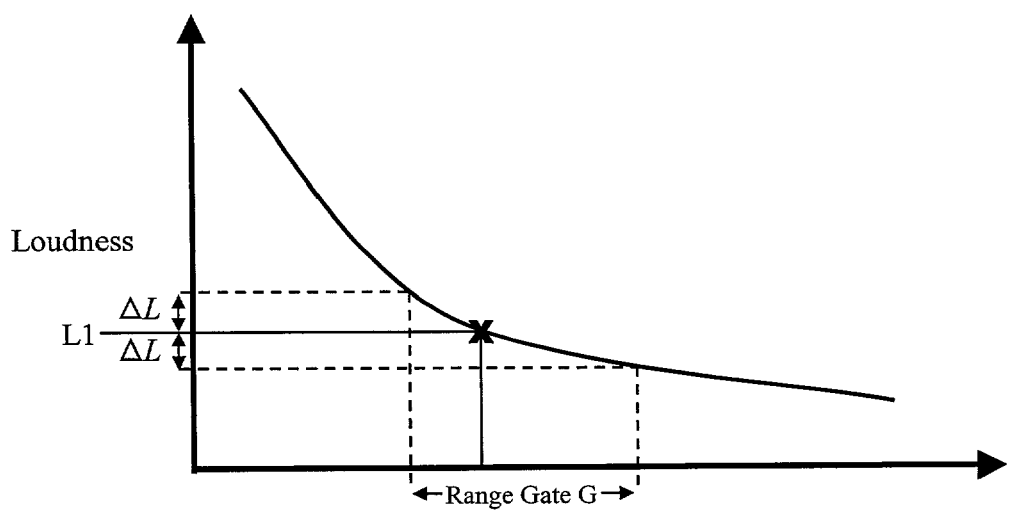
FIG. 19 is a diagram showing a relationship between loudness of a speech input and a range gate set by the FIG. 10 apparatus for limiting the search space of a speech recognizer of the apparatus.

In order to facilitate the operation of the speech recogniser 150, various measures can be taken to the reduce the search space of the recogniser (that is, the range of words with which it tries to match a spoken word received via input 151). In the present case, three different restrictions are applied to the search space though it is to be understood that these restrictions can equally be applied in isolation of each other. These restrictions are:

(i) A restriction to sound sources positioned within a range gate determined by the loudness of the spoken input (this restriction is only relevant where the audio sub-field(s) have depth—that is, a spread of range values). Assuming that the user knows the general range of the sound source the user wishes to select, then the user can speak the audio label of the source at a loudness volume reflecting the range of the source. Typically, the user will speak the label of a nearby source louder than that of a more distant one—the underlying model here is that the user is reflecting the fact that nearby sound sources are generally louder a the user than far away ones. However, it would also be possible to use the opposite scheme where the user speaks louder for further way sources—here the underlying model is that the user needs to speak louder in order for the remote source to 'hear'. The loudness of the speech input is measured by block 154 and converted to a range gate. FIG. 19 shows an example relationship between loudness and range that can be used by block 154; in this case, for a received loudness of L1, a range gate G is determined corresponding to equal increments ΔL either side of L1. The derived range gate G is passed to a restrictions application block 155 that accesses memory 15 to determine which sound sources lie within this range gate. The recogniser search space is then restricted to the labels (or other identification words) associated with the sound sources within the range gate. To help the user speak a label at the correct loudness, it is possible to provide a calibration mode of operation (selected in any suitable manner) in which when a user speaks a word, that word (or another sound) is rendered in the audio field at a range corresponding to that assessed by the loudness-to-range classifier 154; the implementation of this feature is straightforward and will not be described in further detail (ii) A restriction to sound sources that are currently audible. This restriction is implemented by block 155 which accesses memory to determine whether the current value of the audibility parameter of each sound source is such as to permit it to be heard. The recogniser search space is then restricted to the labels (or other identification words) of the currently audible sound sources. It is also possible to arrange for sound sources having reduced audibility (that is, sources muted to at least predetermined degree) to be discarded.

(iii) A restriction to sound sources that lie in the general facing direction of the user. To implement this restriction, the restriction application block 155 is supplied on input 156 with the current facing direction of the user, this direction being supplied by block 26 and specifying the current facing direction relative to the presentation reference vector. Block 155 then searches memory for sound sources lying within a predetermined angular extent of the facing direction (it should be noted that the facing direction supplied to block 155 should first be converted to the same coordinate scheme as applied by converter 66 to the sound source rendering positions). After determining which sound sources lie in the general direction of facing of the user, the block causes the recogniser to restrict its search space to the labels (or other identification words) associated with these sound sources.

Whilst the foregoing assumes that words will be used to identify sound sources, it is also possible to alternatively and/or additionally use specific sounds (such as whistling, clicking, grunts, laughter, humming, etc.) which the recogniser 150 would be set to recognise.

It will be appreciated that although user speech input has been described above in relation to selecting a particular service via its audio label, it is also possible to use speech input to address the service in the service mode of the apparatus (and, indeed, it is also possible to arrange for a service to be addressed and provided with input whilst the apparatus is still in its desktop mode—in this case, addressing a service by speaking its audio label is not assumed to be an indication that full service feed of that service is required, this requiring an additional pre- or post input such as speaking the word "select").

It may also be noted that restricting the speech recogniser search space by excluding the labels associated with services lying outside a range gate indicated by the loudness of the user input, can be used not only with user interfaces where the services are represented through sound sources in an audio field, but also generally with any user interface where items are represented to a user with a perceivable range value and the items have respective associated labels by which they can be addressed. For example, items can be presented on a visual display with the range value of each item being perceivable either by perspective in the visible image or from an associated text label.

It will be appreciated that other techniques additional to those described above can be used for selecting a particular sound source in the spatialized audio field. For example, a point-by-hand interface can be employed in which the user's pointing gestures are detected (for example by sensing changes in an electric field or by interpreting a stereo image) and used to determine which spatialized sound source is being indicated.

Manually-Operated Input Devices

FIGS. 20 to 24 show various forms of manually-operated input device that can be used for input device 136 or 140 of FIG. 18.

Figure 20:
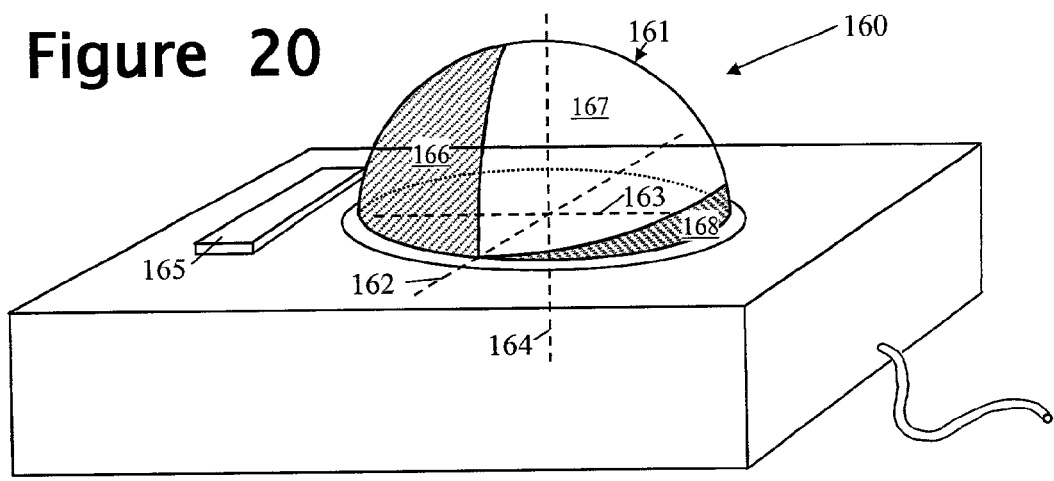
FIG. 20 is a diagram of a trackball type of input device usable by the FIG. 10 apparatus.

FIG. 20 illustrates an input device 160 similar in form to known trackball devices and comprising trackball 161 the rotation of which is measured by sensors (not shown) about two orthogonal axes. The input device 160 is particularly suited for controlling field rotation and audio cursor movement in the case of a spherical audio field, although it can also be used with other forms of audio field.

Conventional trackball devices measure trackball rotation about two axes lying in a horizontal plane (assuming the mounting plane for the trackball to be horizontal). This initially appears inappropriate for a device intended to control rotation of a spherical audio field in azimuth and elevation, rotation in azimuth being about a vertical axis and therefore not directly capable of imitation by a conventional trackball device. Accordingly, it is envisaged that embodiments of device 140 provide for measuring rotation about vertical axis 164 as well as about a horizontal axis such as axis 162.

However, it has been found that having the trackball 161 rotatable about the same axes as a spherical audio field it is intended to control has certain drawbacks. In particular, rotating the trackball about a vertical axis is not a very natural action for the user. Furthermore, where, as in embodiments to be described below, rotations of the trackball are arranged to produce rotations of the same angular extent of the audio field so that the surface of the trackball can be marked with indications of the current orientation of the audio field, having the straight-ahead position lying at the mid-height of the trackball and, as a result, not clearly visible to the user, is not helpful in translating the indications carried by the trackball into information relevant to using the audio field. As a consequence, it is an acceptable compromise to measure the rotation of the trackball about its two horizontal axes 162 and 163 with rotation about the axis 163 being taken as indicating the required azimuth rotation (rotation in elevation being indicated by rotation about axis 162).

By the use of appropriate rotation sensing arrangements, it is possible to sense the current orientation of the trackball 61 and then orientate the audio field to the same orientation; one suitable sensing arrangement involves providing a pattern of markings (not necessarily human visible) on the surface of the trackball such that reading any small area of the pattern opposite a small sensing camera (or other appropriate sensor depending on the nature of the markings) is sufficient to uniquely determine the orientation of the trackball. This permits the trackball to be marked in a human visible manner to indicate to the user the current orientation of the trackball and thus the commanded rotation of the audio field—where no stabilisation offset is applied by block 26, this orientation directly corresponds to that of the audio field relative to the presentation reference vector (this would be the case, for example, where headphones are being used and the audio field is head-stabilised). By way of example, the eight quadrants of the trackball can each be given a respective colour with the aforesaid sensing pattern being marked out using infrared or magnetic inks; FIG. depicts the application of different markings (such as colours) to different quadrants with three such quadrants 166, 167, and 168 being visible.

Directly marking the outside of the trackball to indicate orientation has a disadvantage in that if the trackball 161 is allowed to be rotatable about all three axes 162-164, then rotations about all axes must be measured and corresponding rotations effected to the audio field—if this is not done, the markings on the trackball will quickly cease to correspond to the orientation of the audio field. Whilst it is possible to engineer restrictions on the rotation of the trackball so that it can only rotate about the two desired axes, an alternative and preferred approach is to provide a visual orientation indicator arrangement that uses the sensed rotation of the trackball to determine the orientation to be indicated by the arrangement. Such an arrangement avoids the need to match the orientation of the trackball with that of the audio sphere and it is possible to use a conventional two-axis rotation sensing arrangement that simply measures angular changes (rather than absolute orientations) potentially with slippage.

Figure 21:
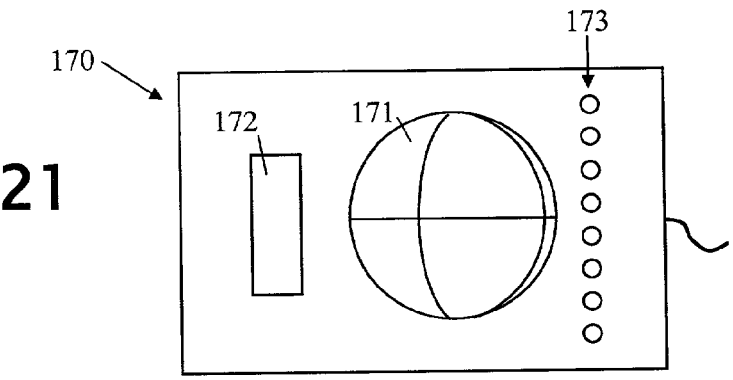
FIG. 21 is a diagram showing a trackball input device similar to FIG. 20 but including a first form of visual orientation indicator arrangement.

One suitable form of fixed visual orientation indicator arrangement is illustrated in FIG. 21 that shows a trackball-based input device 170 similar to that of FIG. 20 but without quadrant markings on the surface of its trackball 171; instead, a row of indicator lights 173 (typically LEDs) is provided. Each LED 173 represents a respective quadrant of the audio field, the quadrant concerned being depicted, for example, by a graphic adjacent the LED. The activation of the LEDs is controlled to indicate the current commanded orientation of the audio field as known to block 26 of the FIG. 10 apparatus. Thus, as a commanded rotation of the audio field brings the presentation reference vector within a quadrant of the audio field (assuming, for the moment, no stabilisation rotation of the audio field), the block causes the LED 173 corresponding to that quadrant to be activated, all other LEDs being deactivated.

Rather than arranging the LEDs 173 in a row, different coloured LEDs (or other light emitting devices) could be grouped together inside the trackball itself, the latter being translucent or transparent so the user can see the colour of the currently activated LED and therefore gain an indication of the current orientation of the audio sphere. This latter configuration requires an appropriate arrangement for powering the LEDs inside the trackball and this can be achieved either by an arrangement of sliding contacts or by flexible wiring runs and physical limiters on the movement of the trackball to prevent excessive twisting of the wiring. In a further alternative embodiment of the indicator arrangement, the trackball surface is covered with a layer the visual properties of which can be altered by control signals; in this manner the visual appearance of the trackball provides the desired orientation indication.

Rather than the visual orientation indicator arrangement indicating the orientation of the audio field relative to the presentation reference vector without regard to any stabilisation rotation of the audio field (that is, only indicating the commanded rotation), it is preferable to arrange for the indicator arrangement to indicate the audio-field orientation relative to a selected "indicator reference" direction (for example, the presentation reference vector, the current facing direction of the user, the forward-facing direction of the user, a world-fixed direction such as North, or a vehicle straight-ahead direction for in-vehicle audio systems) with account being taken, where required, of any rotation of the audio field effected to give it a specified stabilisation. The required output indication from the indicator arrangement is determined, for example, by block 26 and may require information (rotation of the user's head relative to their body, rotation of the user's head relative to the world or to a vehicle, rotation of the user's body relative to the world or to a vehicle) not available from any sensors currently being used for achieving a specified audio-field stabilisation sensors—in such cases, the appropriate sensors will need to be provided to supply the required information to the block 26.

Figure 22:
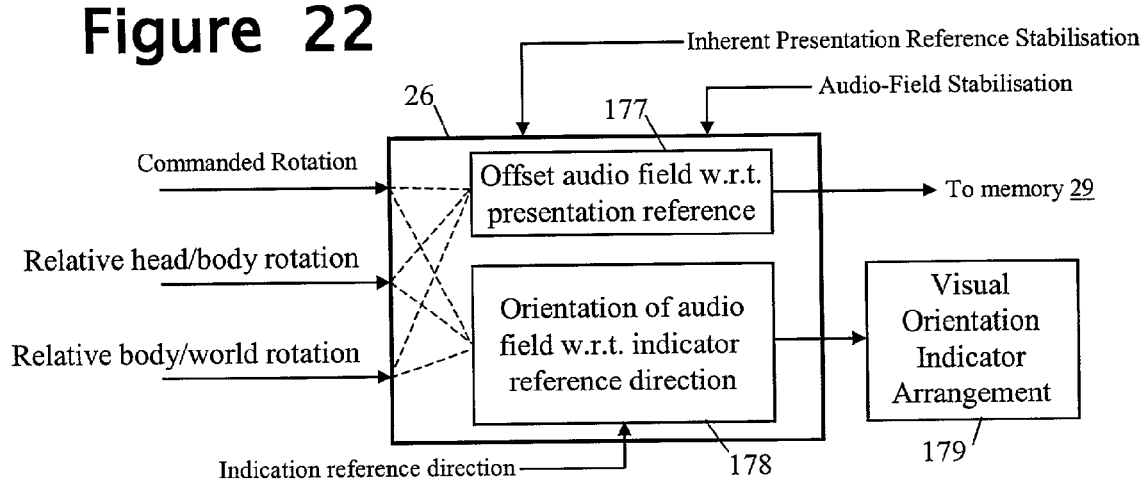
FIG. 22 is a block diagram of functionality for determining the orientation of the audio field relative to an indicator reference.

Basically, in order for the block 26 (or other processing means) to appropriately control the visual orientation indicator arrangement, it needs to know about any changes in the offset between the audio field reference and the presentation reference vector (either user commanded or required to achieve a particular stabilisation), as well as any changes in the orientation of the indicator reference direction relative to the presentation reference (caused, for example, by rotation of the user's head or body). In certain cases, at least components of the changes in the offset between the audio field reference and the presentation reference vector required to achieve a particular stabilisation in the presence of rotation of the user's head/body, will match the changes in orientation of the indicator reference relative to the presentation reference resulting from the rotation of the user's head/body. In such cases, it is only necessary to take account of the unmatched components (notably, but not in all cases exclusively, the user-commanded component) of the offset between the audio field reference and the presentation reference. In implementing block 26 (or other processing means) for determining the orientation between the audio-field reference and the indicator reference direction, it is not, of course, necessary first to determine the offset between the audio field reference and the presentation reference vector and the orientation of the indicator reference relative to the presentation reference, before going on to determine the orientation between the audio-field reference and the indicator reference direction; instead the various measured components can be directly combined to determine the orientation between the audio-field reference and the indicator reference direction (with components that match each other out preferably not being processed). This is depicted in FIG. 22 where block 26 is shown as having a processing sub-block 177 for determining the offset between the audio-field reference and the presentation reference, and a processing sub-block 178 for determining the orientation between the audio-field reference and the indicator reference direction, each sub-block working directly from measured components (for example: commanded rotation, rotation of user's head relative to user's body, and rotation of user's body relative to the world—from which rotation of the user's head relative to the world can be derived; it will be appreciated that this latter could be measured, in which case one of the other measured components—not commanded input—is no longer needed). Sub-block 178 controls a visual orientation indicator arrangement 179.

The table below indicates for audio output devices in the form of headphones (inherently head-stabilised), the component quantities needed to be known, for each of three different stabilisations, in order to determine the orientation of the audio field relative to each of three different indicator reference directions.

| Stabilisation | Indicator Reference | Orientation of Audio-Field w.r.t. Indicator Reference |
|---|---|---|
| Head Stabilised (inherent) | Current facing direction (presentation reference) | Commanded rotation |
| | Forward facing direction | Commanded rotation + head rotation (wrt body) [1] |
| | World direction | Commanded rotation + Head rotation (wrt world) [1] |
| Body Stabilised | Current facing Direction (presentation reference) | Commanded rotation − head rotation (wrt body) |
| | Forward facing direction | Commanded rotation |
| | World direction | Commanded rotation + Body rotation (wrt world) [1] |
| World Stabilised | Current facing direction (presentation reference) | Commanded rotation − Head rotation (wrt world) |
| | Forward facing direction | Commanded rotation − Body rotation (wrt world) [1,2] |
| | World direction | Commanded rotation |

[1] Requires sensing additional to that needed for stabilisation
[2] In this case, any component of the offset between the audio-field reference and the presentation reference that is due to rotation of the user's head relative to the user's body is matched by a change in orientation of the indicator reference direction relative to the presentation reference, thereby leaving the offset components of the user-commanded rotation and rotation of the user's body relative to the world.

In one preferred embodiment, the audio field is body-stabilised and the indicator reference direction is the forward-facing direction of the user.

Similar tables can readily be produced for body-mounted, vehicle-mounted, and world-mounted audio output devices. Also, the tables can be extended to include vehicle-stabilised audio fields and an indicator reference direction of a vehicle straight-ahead direction.

It will be appreciated that embodiments of the visual orientation indicator arrangement that indicate the current orientation of the audio field relative to a specified indicator reference direction as described above, facilitate an appreciation by the user what part of the audio field they are currently looking at and enables them to more rapidly find a desired service sound source. It will also be appreciated that the visual orientation indicator arrangement may change the indicated audio-field orientation without any operation of the trackball if the orientation of the user changes and results in audio-field rotation relative to the indicator reference direction as a consequence of the current audio field stabilisation.

The LEDs 173 can also be used to indicate when a new service sound source appears within a quadrant and/or when a service sound source in a quadrant has a new notification. In either case, the LED for the quadrant in which the service sound source lies can be arranged to flash at least for a limited period. If the LED concerned is already activated because it encompasses the selected direction controlling LED activation, then the LED can still be flashed to provide the required indication. It is, of course, possible to provide a separate set of LEDs (or other visual indicators) solely for the purpose of indicating a new source or new notification in which case the required indication can simply be activation of the relevant LED. A set of LEDs can be provided for this purpose in device 160 of FIG. 20.

Figure 23:
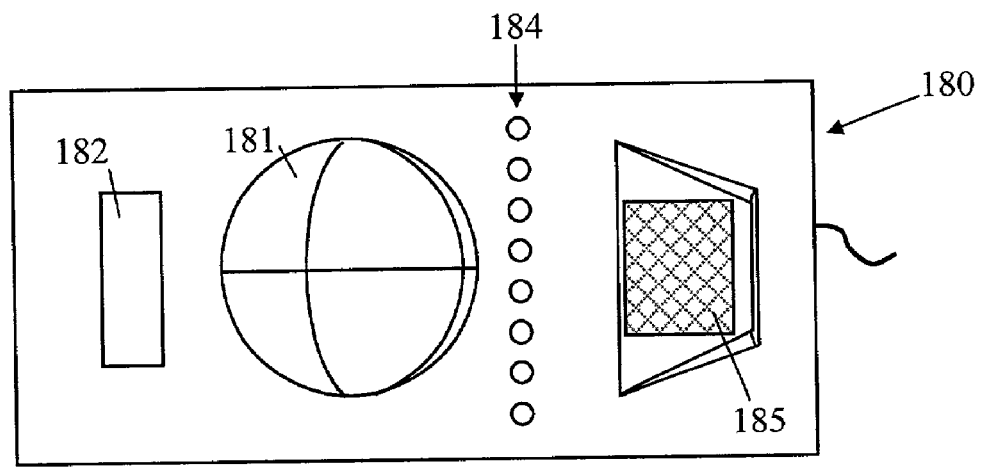
FIG. 23 is a diagram showing a trackball input device similar to FIG. 20 but including a second form of visual orientation indicator arrangement.

Another suitable form of fixed visual orientation indicator arrangement is illustrated in FIG. 23 that shows a trackball-based input device 180 in which a small display panel 185 is mounted to show a depiction of that part of the audio field lying either side of the indicator reference direction. This depiction preferably gives both an indication of the portion of the audio field concerned (for example, in terms of field coordinate ranges, or a quadrant name), and an indication of the sound sources in this portion of the audio field. The orientation of the audio field can be indicated by other types of diagram or image displayed on display panel 185.

The FIG. 23 input device also includes, as well as a trackball 181, a set of LEDS for indicating, in the manner described above with reference to FIG. 21, when a new sound source or new notification is available.

Figure 24:
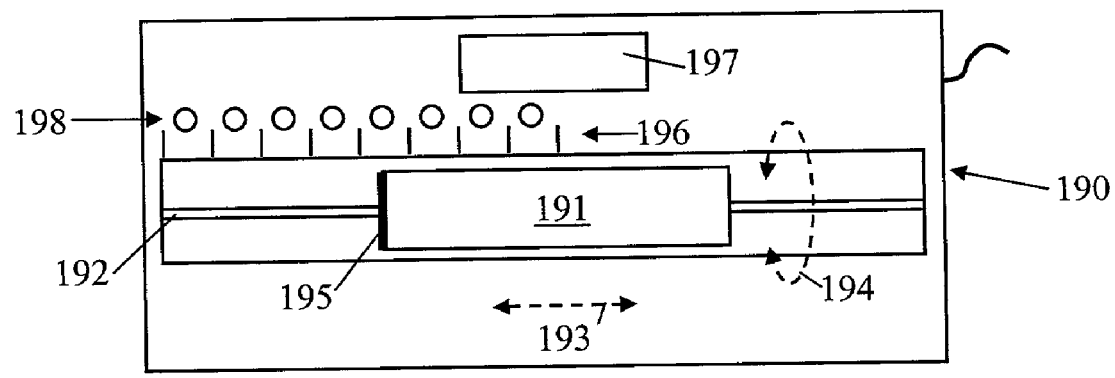
FIG. 24 is a diagram of another form of input device usable by the FIG. 10 apparatus, this device being suitable where the apparatus is arranged to produce a cylindrical audio field.

FIG. 24 shows a form of input device 190 specifically adapted for use with cylindrical audio fields though also usable with other fields. The input device 190 comprises a cylinder 191 that can be moved by hand back and forth along a shaft 192 coaxial with cylinder 191 (see dashed arrow 193) as well as rotated (see dashed arrow 194) about the shaft. Both the position of the cylinder 191 along the shaft 192 and the angular position of the cylinder 191 about the shaft are measured by suitable sensor arrangements (for example, electro-optical sensors) and are respectively used to set the height and azimuth angle of the cylindrical field being controlled. The cylinder 191 carries an index marking 195 that cooperates with a fixed scale 196 to indicate the current height of the audio field. Further markings (not shown) on the cylinder can be used to indicate the current azimuth setting of the audio field. A set of LEDs 198 (or other light output devices) can be used to indicate the presence of a new sound source or of a new notification, the LED 198 activated being dependent on the height of the sound source concerned (the scale 196, or other markings, can be used to indicate the height significance of each LED).

With the form of the input device 190 shown in FIG. 24, because the azimuth orientation of the audio field is indicated by markings carried by the cylinder 191, only the offset between the audio-field reference and presentation reference can be indicated and this without any account being taken of rotation of the audio field to achieve a particular field stabilisation. To overcome these limitations, the input device 190 can be provided with any of the above-described forms of visual orientation indicator arrangements controlled by block 26 to give the field orientation relative to a given indicator reference direction.

It will be appreciated that the above-described forms of visual orientation indicator arrangements controlled by block 26 (or other processing means) to give the field orientation relative to a given indicator reference direction, can be implemented separately from the input devices themselves. Furthermore, the visual orientation indicator arrangements can still be employed where the user is not provided with means to change the offset between the audio field reference and the presentation reference (though, of course, there is little point in doing this in the above-mentioned cases where the user-commanded input was the only variable component of the orientation of the audio field reference relative to the indicator reference). Finally, it may be noted that the orientation of the audio-field reference relative to the indicator reference may have one, two or more degrees of freedom and the visual orientation indicator arrangement is therefore preferably correspondingly adapted to be able to indicate all degrees of orientation changes. By way of example, where a head-stabilised audio field is presented through headphones and the indicator reference direction is the current facing direction, then if only azimuth changes are involved for user-commanded rotations, for audio-field stabilisation and in determining the current orientation of the indicator reference relative to the audio field, then the orientation of the audio field relative to the indicator reference has only a single degree of freedom; however, if, for example, the user-commanded inputs can also change the elevation between the audio field reference and the presentation reference, then the orientation of the audio field relative to the indicator reference will have two degrees of freedom. The visual orientation indicator arrangement can, however, be restricted to indicate less than all of the degrees of freedom associated with the orientation of the audio field relative to the indicator reference.

Each of the input devices 160, 170, 180 and 190 also includes a selection button, respectively 165, 172, 182, and 197 for enabling the user to indicate that they wish to select a particular service either lying in the selection direction or overlaid with the audio cursor. Where sub field rotation/displacement (including rotation/displacement of a cursor sub-field) is to be controlled by any of the devices, then that device is preferably also provided with means for selecting which sub field is to be controlled; these means can take any suitable form such as selection buttons, a rotary selector switch, a touch screen selection display, etc. Similarly, selection means can be provided to switch between audio (sub-)field control and cursor control where the cursor, instead of being associated with a sub-field, has its rendering position directly controlled by the input device. Further selection means can be provided to enable a user to select a particular indicator reference direction from a set of such directions which block 26 is set up to handle.

The input devices described above are suitable for use with 2D audio fields. The devices are also suitable for 3D audio fields where the field/audio cursor is not required to be moved in the third (range) dimension. Where exploration in the third dimension is required (such as when an audio cursor is to be moved back and forth in the Z or range dimension), each device can be provided with a range slider generating an output signal in dependence on the position of a slider along a track.

Variants

It will be appreciated that many variants are possible to the above described embodiments of the invention. For example, in relation to the cylindrical audio field forms described above, whilst these have been described with the axis of the cylindrical field in a vertical orientation, other orientations of this axis are possible such as horizontal. Also with respect to the cylindrical field form embodiments, it is possible to implement such embodiments without the use of leakage into the focus zone and, indeed, in appropriate circumstances, even without the use of a focus zone.

As regards the audio labels used to announce each service sound source in the desktop mode of the described apparatus, these labels can include a component that is dynamically determined to indicate the actual or relative position of the corresponding sound sources in the audio field. Thus, if an email service is provided on the second floor of an audio field organised as depicted in FIG. 8, then the audio label could be "email on second" or "email down one" (where the user is currently located on the third floor). As another example, the audio label of a service sound source can include the word "left" or "right" to indicate whether the service is to the left or right of the user. Thus, a service sound source may indicate its location as "upper left" when situated to the left and above the reference direction being used. In one implementation of this feature, a dynamic label processor continually checks the position of each sound source (either its absolute position in the audio field or its position relative to a selected reference such as the user's current facing direction, or straight-ahead facing direction, or the presentation reference) and updates the audio label of the sound source accordingly in memory 14. In an alternative implementation, the sounding effector 74 (see FIG. 10) is arranged to add an appropriate location key word(s) to each label according to the value of a location parameter that is set for each sound source by a location-label setter of the source parameter set/modify block 70. This location-label unit functions by examining the position of each sound source at frequent intervals and determining the appropriate location keyword(s) to add to its audio label depending on the absolute or relative position of the sound source (again, relative position can be judged in relation to any appropriate reference such as user current facing direction, straight-ahead facing direction, or presentation reference). As regards the details of determining the location of a sound source relative to the selected reference, this is similar to the above-described determination of the orientation of the audio-field reference relative to the indicator reference for controlling a visual orientation display arrangement; however, a further, possibly variable, component, is now involved, namely the location of the sound source relative to the audio-field reference. Whilst the location of a sound source relative to the selected reference may have two or more degrees of freedom, in some embodiments it may be appropriate to restrict determination of this relative location to only one of the degrees of freedom, the audio indication of this relative location being similarly limited.

The possibility of having multiple sound sources associated with a service has been generally described above. One example where this can be useful is in relation to a service such as electronic mail or voice mail where it is desired to be able to directly select either the mail inbox or outbox (or message generation function).; in this case, each of these service elements is represented by a corresponding sound source in the desktop audio field.

Another example of the use of multiple sound sources associated with the same service was given above in relation to the ghost advisory service used to provide upper and lower summary sound sources 60, 61 (see FIG. 8 and related description). The advisory service is a ghost service in the sense that its only manifestation is through the audio labels associated with its sound sources—there is no underlying service component that can be activated by selection of the sound sources.

A further example of a ghost service with multiple sound sources is the use of a sub-field to provide an audio compass available to the user independently of whatever other audio sub-fields are being provided. The compass sub-field takes the form of a world-stabilised sub-field with one or more sound sources at key compass points (such as north, south, east and west, and the user's current facing direction). An electronic compass can be used to provide the necessary input to block 26 to rotate the audio sub-field such that the spatialized north sound source always lay in the north direction relative to the user (the other key compass point sound sources, being then automatically correctly aligned as a result of their positioning in the audio field relative to the north sound source). The compass-point sound sources can be set to announce continually or, where speech command input is provided, only when a command (such as "Compass") is spoken. Similarly, the user's current facing direction can be arranged to be announced upon the user issuing a command such as "Direction". Whilst the accuracy of perception by the user of the key compass points announced through the spatialized sound sources will only be very approximate, the announcement of the current facing direction can give the user much more precise direction information since it announces a measured direction rather than relying on spatial audio awareness to convey the direction information.

Of course, the audio compass can also be implemented where only a single, world-stabilised audio field is produced by the apparatus. Furthermore, additional useful functionality can be achieved by linking the apparatus with an electronic map system that has an associated absolute position determining system such as a GPS system. In this case, the user can specify a map location (for example, by pointing to it where the electronic map system has an appropriate display subsystem for detecting which map location is being pointed to) and a sound source is then automatically generated in the audio field in alignment with the direction of the map location indicated. This sound source can output an audio label giving information about what is at the map location and also give instructions as to whether the user needs to turn their head left or right to look directly in the direction of the map location. Another possible function would be to tell the user what is ahead in their current facing direction or current direction of travel.

It will be appreciated that most of the functionality of the functional blocks of the various forms of apparatus described above, will typically be implemented in software for controlling one or more general-purpose or specialised processors according to modem programming techniques. Furthermore, whilst a number of separate memories have been illustrated the described embodiments, it will be appreciated that this is done to facilitate a clear description of the operation of the apparatus; memory organisations and data structures different to those described above are, of course, possible.

It should also be understood that the term "services" as used above has been used very broadly to cover any resource item that it may be useful to indicate to the user in much the same way as a PC visual desktop can be used to represent by visible icons a wide variety of differing resource items including local software applications and individual documents as well as remote services. However, as illustrated by the above-described ghost services, the described forms of apparatus can also be used to present items that are not simply place-holders for underlying services but provide useful information in their own right.

The invention claimed is:

1. An audio user-interfacing method in which items, at least some of which are service labels, are represented in an audio field by corresponding synthesized sound sources from where item-related sounds appear to emanate, the method comprising:
   associating only some of the sound sources as members of a collection;
   upon user command, and within an audio environment formed by audibly present sound sources unrelated to said collection, changing the collection in either direction between:
      an un-collapsed state in which the member sound sources are individually audibly present in the audio field; and
      a collapsed state in which the member sound sources are fully muted and a collection-representing sound source provides an audible presence for the collection; and
   selecting a service by selecting the sound source representing the corresponding service label.

2. A method according to claim 1, wherein the collection changes state, at least in one direction, automatically upon detection of predetermined trigger conditions.

3. A method according to claim 1, wherein the collection-representing sound source remains audibly present in the audio field when the collection is in its un-collapsed state.

4. A method according to claim 1, wherein the collection-representing sound source is fully muted when the collection is in its un-collapsed state.

5. A method according to claim 1, wherein the change between collection states, at least in one direction, is accompanied by a corresponding sound suggestive of moving to the end state of the current change.

6. A method according to claim 1, wherein the change between collection states, at least in one direction, is accompanied by moving the member sound sources through the audio field between their normal locations and the location of the collection-representing sound source, the direction of this movement being dependent on the end state of the current change.

7. A method according to claim 1, wherein when the collection is in its collapsed state, the collection-representing sound source provides an audio label for the collection, this label being repeated at intervals.

8. A method according to claim 1, wherein when the collection is in its collapsed state, the collection-representing sound source outputs at least extracts of the sounds associated with the collection member sound sources when un-collapsed.

9. A method according to claim 1, wherein the collection is associated with a respective audio-field reference relative to which the member sound sources of the collection are positioned, other sound sources in the audio field being positioned relative to one or more further audio-field references, the audio-field references being independently movable relative to a presentation reference determined by a mounting configuration of audio output devices used to synthesise said sound sources, with movement of a said audio-field reference relative to the presentation reference resulting in corresponding movement of the associated sound sources.

10. A method according to claim 9, wherein the audio field reference associated with the collection is world-stabilised and the member sound sources represent augmented reality services, each member sound source being positioned relative to the audio field reference of the collection such that for a user located in a notional reference position, the sound source lies in the same direction as a corresponding real-world location associated with the augmented reality service represented by the sound source.

11. A method according to claim 1, wherein the audio field is rendered by apparatus including audio output devices according to sound-source data indicative of the rendering position and audibility of the each sound source in the audio field, the muting and un-muting of said member sound sources to collapse and un-collapse the collection being effected by changing the sound-source data for these sound sources to appropriately set the audibility of the sources.

12. A method according to claim 1, wherein upon un-collapsing of the collection, at least some of the other sound sources in the audio field have their positions in the audio field adjusted.

13. Apparatus for providing an audio user interface in which items, at least some of which are audio labels for services, are represented in an audio field by corresponding synthesized sound sources from where sounds related to the items appear to emanate, the apparatus comprising:

a data store for storing data on the sound sources, this data including audibility data for controlling the audibility of the sources in the audio field, and collection data for associating only some of the sound sources into a collection of which those sound sources are members and for further associating with the collection a collection-representing sound source;

a rendering position determining arrangement for determining, for each of said sound sources, a respective associated rendering position at which the sound source is to be synthesized to sound in the audio field;

a collection-control arrangement for changing, upon user command, the collection in either direction between un-collapsed and collapsed states and for correspondingly setting the audibility data of the collection-related sound sources such that:

in the un-collapsed state of the collection, the member sound sources are audible at their respective rendering positions; and in the collapsed state of the collection, the member sound sources are fully muted and the collection-representing sound source provides an audible presence for the collection in the audio field;

a rendering subsystem, including audio output devices, for generating an audio field in which said sound sources are synthesized at their associated rendering positions and with the audibility of the collection-related sound sources set by said collection-control arrangement, the rendering subsystem being arranged to audibly present in said audio field, independently of the current state of said collection, those sound sources that are unrelated to said collection; and a selection arrangement for enabling a user to select a service by selecting the corresponding audio-label sound source.

14. Apparatus according to claim 13, wherein the collection-control arrangement is arranged to automatically change the state of the collection, at least in one direction, upon detection of predetermined trigger conditions.

15. Apparatus according to claim 13, wherein the collection-control arrangement is arranged to set the audibility data of the collection-representing sound source such that this source remains present in the audio field when the collection is in its un-collapsed state.

16. Apparatus according to claim 13, wherein the collection-control arrangement is arranged to set the audibility data of the collection-representing sound source such that this source is muted in the audio field when the collection is in its un-collapsed state.

17. Apparatus according to claim 13, wherein the collection-control arrangement is arranged in changing between collection states, at least in one direction, to modify the rendering positions of the member sound sources such they move through the audio field between their normal positions and the positions of the collection-representing sound source, the direction of this movement being dependent on the end state of the current change.

18. Apparatus according to claim 13, wherein when the collection is in its collapsed state, the collection-representing sound source provides an audio label for the collection, this label being repeated at intervals.

19. Apparatus according to claim 13, further comprising a notification arrangement arranged when the collection is in its collapsed state, to provide via the collection-representing sound source, audio notifications of events related to the items represented by the member sound sources.

20. Apparatus according to claim 13, wherein the rendering-position determining arrangement comprises:

a setting arrangement for setting the location of each said collection member sound source relative to an audio-field reference;

a control arrangement for controlling an offset between the audio field reference and a presentation reference, the presentation reference being determined by a mounting configuration of the audio output devices; and a deriving arrangement for deriving the rendering position of each sound source based on the location of the sound source in the audio field and said offset.

21. Apparatus according to claim 20, wherein the collection member sound sources represent augmented reality services that have associated real-world locations, the rendering-position determining arrangement being arranged to world-stabilise the audio field reference associated with the collection and to position each member sound source relative to the audio field reference such that for a user located in a notional reference position, the sound source lies in the same direction as the corresponding said real-world location.

22. Apparatus according to claim 20, wherein the said setting arrangement for setting an offset between the audio field reference and a presentation reference, comprises user input arrangement for enabling a user to change said offset, and a stabilisation arrangement for varying the said offset such as to stabilise the audio field reference relative to one of:

a user's head;
a user's body;
a vehicle mounting the apparatus;
the world.

23. Apparatus for providing an audio user interface in which items are represented in an audio field by corresponding synthesized sound sources from where sounds related to the items appear to emanate, the apparatus comprising:

a data store for storing data on the sound sources, this data including audibility data for controlling the audibility of the sources in the audio field, and collection data for associating only some of the sound sources into a collection of which those sound sources are members and for further associating with the collection a collection-representing sound source;

a rendering-position determining arrangement arranged to determine, for each of said sound sources, a respective associated rendering position at which the sound source is to be synthesized to sound in the audio field;

a collection-control arrangement arranged to change, upon user command, the collection in either direction between un-collapsed and collapsed states and to correspondingly set the audibility data of the collection-related sound sources such that:

in the un-collapsed state of the collection, the member sound sources are audible at their respective rendering positions; and in the collapsed state of the collection, the member sound sources are fully muted and the collection-representing sound source provides an audible presence for the collection in the audio field;

a rendering subsystem, including audio output devices, arranged to generate an audio field in which said sound sources are synthesized at their associated rendering positions with the audibility of the collection-related sound sources set by said collection-control arrangement, the rendering subsystem being arranged to audibly present in said audio field, independently of the current state of said collection, any said sound sources that are unrelated to said collection; and a notification arrangement arranged when the collection is in its collapsed state to provide via the collection-representing sound source, audio notifications of events related to the items represented by the member sound sources.

24. Apparatus according to claim 23, wherein the collection-control arrangement includes a user input arrangement for changing the collection state, at least in one direction.

25. Apparatus according to claim 23, wherein the collection-control arrangement is arranged to automatically change the state of the collection, at least in one direction, upon detection of predetermined trigger conditions.

26. Apparatus according to claim 23, wherein the collection-control arrangement is arranged to set the audibility data of the collection-representing sound source such that this source remains present in the audio field when the collection is in its un-collapsed state.

27. Apparatus according to claim 23, wherein the collection-control arrangement is arranged to set the audibility data of the collection-representing sound source such that this source is muted in the audio field when the collection is in its un-collapsed state.

28. Apparatus according to claim 23, wherein the collection-control arrangement is arranged in changing between collection states, at least in one direction, to modify the rendering positions of the member sound sources such they move through the audio field between their normal positions and the positions of the collection-representing sound source, the direction of this movement being dependent on the end state of the current change.

29. Apparatus according to claim 23, wherein when the collection is in its collapsed state, the collection-representing sound source provides an audio label for the collection, this label being repeated at intervals.

30. Apparatus according to claim 23, wherein the rendering-position determining arrangement comprises:
   a setting arrangement for setting the location of each said collection member sound source relative to an audio-field reference;
   a control arrangement for controlling an offset between the audio field reference and a presentation reference, the presentation reference being determined by a mounting configuration of the audio output devices; and
   a deriving arrangement arranged to derive the rendering position of each sound source based on the location of the sound source in the audio field and said offset.

31. Apparatus according to claim 30, wherein the collection member sound sources represent augmented reality services that have associated real-world locations, the rendering-position determining arrangement being arranged to world stabilise the audio field reference associated with the collection and to position each member sound source relative to the audio field reference such that for a user located in a notional reference position, the sound source lies in the same direction as the corresponding said real-world location.

32. Apparatus according to claim 30, wherein the said setting arrangement comprises a user input arrangement arranged to enable a user to change said offset, and a stabilisation arrangement arranged to vary the said offset such as to stabilise the audio field reference relative to one of:
   a user's head;
   a user's body;
   a vehicle mounting the apparatus;
   the world.

33. An audio user-interfacing method in which items are represented in an audio field by corresponding synthesized sound sources from where sounds related to the items appear to emanate, the method comprising:
   associating some only of the sound sources into a collection of which they are members;
   upon user command, and within an audio environment formed by audibly-present sound sources unrelated to said collection, changing the collection in either direction between:
      an un-collapsed state in which the member sound sources are individually audibly present; and
      a collapsed state in which the member sound sources are fully muted and a collection-representing sound source provides an audible presence for the collection; and
   using the collection-representing sound source, when, the collection is in its collapsed state, to provide audio notifications of events related to the items represented by the member sound sources.

34. A method according to claim 33, wherein the collection changes state, at least in one direction, automatically upon detection of predetermined trigger conditions.

35. A method according to claim 33, wherein the collection-representing sound source remains audibly present in the audio field when the collection is in its un-collapsed state.

36. A method according to claim 33, wherein the collection-representing sound source is fully muted when the collection is in its un-collapsed state.

37. A method according to claim 33, wherein the change between collection states, at least in one direction, is accompanied by a corresponding sound suggestive of moving to the end state of the current change.

38. A method according to claim 33, wherein the change between collection states, at least in one direction, is accompanied by moving the member sound sources through the audio field between their normal locations and the location of the collection-representing sound source, the direction of this movement being dependent on the end state of the current change.

39. A method according to claim 33, wherein when the collection is in its collapsed state, the collection-representing sound source provides an audio label for the collection, this label being repeated at intervals.

40. A method according to claim 33, wherein when the collection is in its collapsed state, the collection-representing sound source outputs at least extracts of the sounds associated with the collection member sound sources when un-collapsed.

41. A method according to claim 33, wherein the collection is associated with a respective audio-field reference relative to which the member sound sources of the collection are positioned, other sound sources in the audio field being positioned relative to one or more further audio-field references, the audio-field references being independently movable relative to a presentation reference determined by a mounting configuration of audio output devices used to synthesise said sound sources, with movement of a said audio-field reference relative to the presentation reference resulting in corresponding movement of the associated sound sources.

42. A method according to claim 41, wherein the audio field reference associated with the collection is world-stabilised and the member sound sources represent augmented reality services, each member Sound source being positioned relative to the audio field reference of the collection such that for a user located in a notional reference position, the sound source lies in the same direction as a corresponding real-world location associated with the augmented reality service represented by the sound source.

43. A method according to claim 33, wherein the audio field is rendered by apparatus including audio output devices according to sound-source data indicative of the rendering position and audibility of the each sound source in the audio field, the muting and un-muting of said member sound sources to collapse and un-collapse the collection being effected by changing the sound-source data for these sound sources to appropriately set the audibility of the sources.

44. A method according to claim 33, wherein upon un-collapsing of the collection, at least some of the other sound sources in the audio field have their positions in the audio field adjusted.

* * * * *